US010960736B2

(12) United States Patent
Savoie et al.

(10) Patent No.: US 10,960,736 B2
(45) Date of Patent: Mar. 30, 2021

(54) CLIP ASSEMBLY AND WINDSHIELD ASSEMBLY FOR SELECTIVELY CONNECTING A WINDSHIELD TO A VEHICLE

(71) Applicant: BOMBARDIER RECREATIONAL PRODUCTS INC., Valcourt (CA)

(72) Inventors: Felix Savoie, Sherbrooke (CA); Miguel Berthelette, Shefford (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 0 days.

(21) Appl. No.: 16/647,827

(22) PCT Filed: Sep. 13, 2018

(86) PCT No.: PCT/IB2018/057030
§ 371 (c)(1),
(2) Date: Mar. 16, 2020

(87) PCT Pub. No.: WO2019/058235
PCT Pub. Date: Mar. 28, 2019

(65) Prior Publication Data
US 2020/0215880 A1 Jul. 9, 2020

Related U.S. Application Data

(60) Provisional application No. 62/560,480, filed on Sep. 19, 2017.

(51) Int. Cl.
B60J 1/00 (2006.01)
B60J 1/02 (2006.01)
(Continued)

(52) U.S. Cl.
CPC ............. B60J 1/006 (2013.01); B60J 1/025 (2013.01); F16B 2/18 (2013.01); B60J 10/70 (2016.02)

(58) Field of Classification Search
CPC ....... B60J 10/70; B60J 1/02; B60J 1/06; B60J 1/006; B60J 1/04; B60J 1/005;
(Continued)

(56) References Cited

U.S. PATENT DOCUMENTS 4,615,556 A * 10/1986 Stahel ...................... B62J 17/04
296/78.1
6,176,538 B1 1/2001 Lawson et al.
(Continued)

OTHER PUBLICATIONS

International Search Report of PCT/IB2018/057030; Blaine R. Copenheaver; dated Jan. 8, 2019.

Primary Examiner — D Glenn Dayoan
Assistant Examiner — Sunsurraye Westbrook
(74) Attorney, Agent, or Firm — BCF LLP

(57) ABSTRACT

A clip assembly and a windshield for selectively connecting a windshield to a vehicle. The windshield defines at least one windshield aperture and the clip assembly includes a windshield member including a windshield member head larger than a corresponding portion of the at least one windshield aperture, and a windshield member body being sized and shaped for passing through the at least one windshield aperture; a vehicle member including a projection for extending through the frame aperture when the windshield is connected and defining a pivot axis about which the vehicle member pivots with respect to the at least one frame member when transitioning between a latched position and an unlatched position; and a connecting member selectively connected between the windshield member and the vehicle member, the connecting member, the windshield member and the vehicle member forming an overcenter latch.

20 Claims, 18 Drawing Sheets

(51) Int. Cl.
*F16B 2/18* (2006.01)
*B60J 10/70* (2016.01)

(58) Field of Classification Search
CPC ... B60J 10/30; B60J 1/007; B60J 10/18; B60J 10/45; B60J 10/16; F16B 2005/0678; F16B 2200/509; F16B 2/20
USPC .. 296/96.21, 192, 84.1, 78.1, 146.15, 96.22, 296/191; 428/172, 192, 34, 428; 52/208, 52/204.591, 786.13, 204.62, 214, 311.2
See application file for complete search history.

(56) References Cited

U.S. PATENT DOCUMENTS

| | | | |
|---|---|---|---|
| 6,241,304 B1 * | 6/2001 | Frost | B60J 10/70 296/146.15 |
| 7,452,023 B2 * | 11/2008 | Hanson | B60J 1/06 296/84.1 |
| 9,475,363 B2 * | 10/2016 | Mauro | B60J 1/06 |
| 2002/0084126 A1 | 7/2002 | Bedard et al. | |
| 2005/0039316 A1 * | 2/2005 | Dolan | B60J 10/30 29/450 |
| 2005/0168007 A1 | 8/2005 | Westendorf et al. | |
| 2006/0232091 A1 | 10/2006 | Fox et al. | |
| 2009/0079219 A1 | 3/2009 | Caprio | |

* cited by examiner

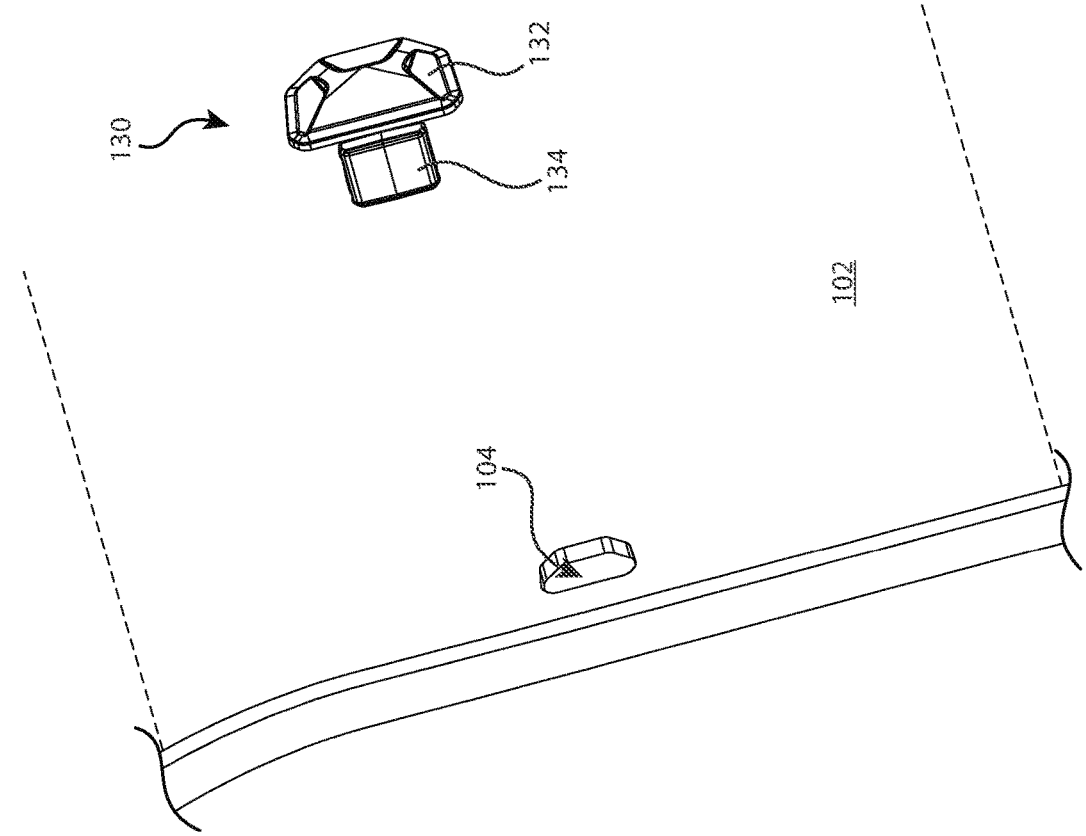
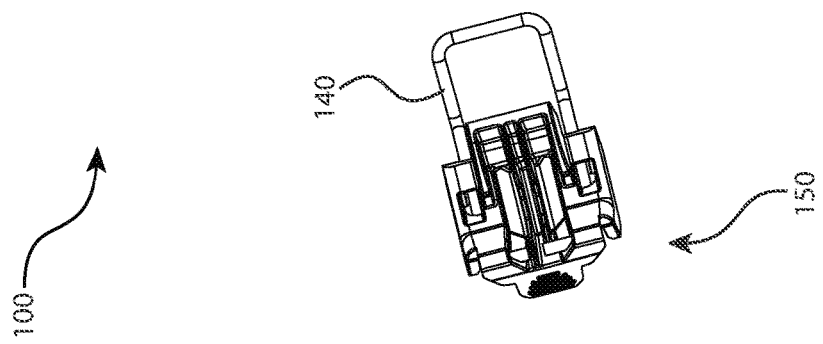
FIG. 7

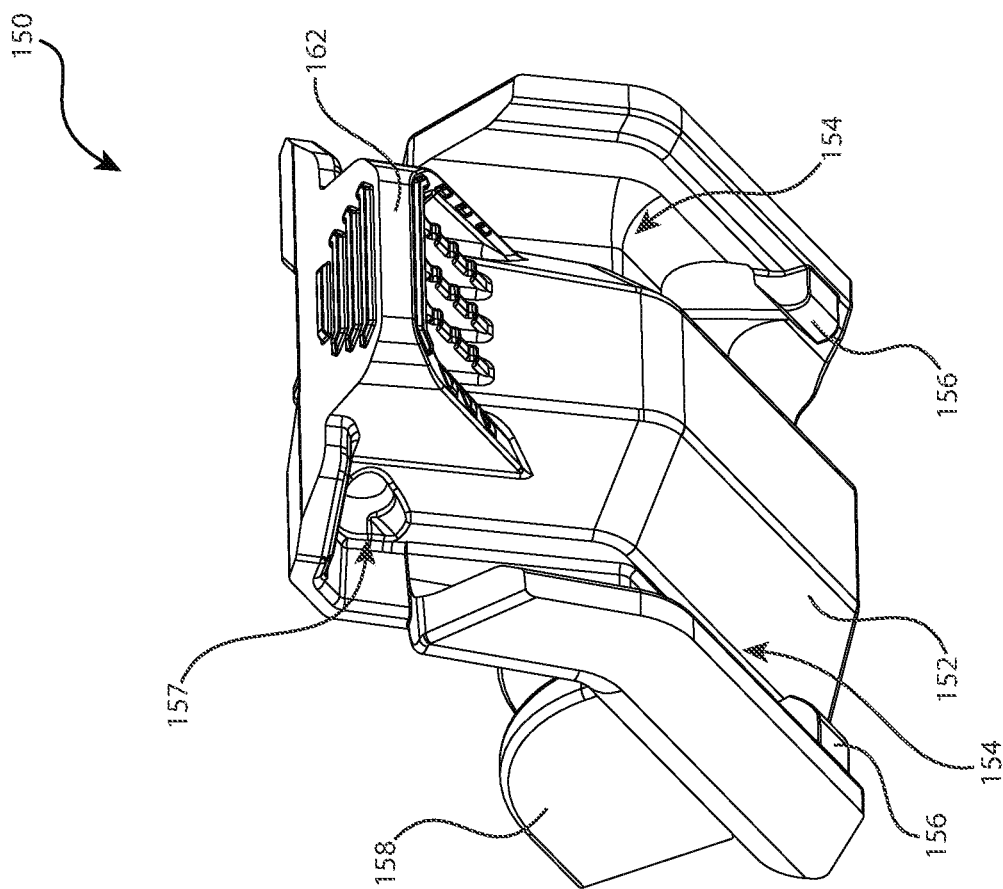
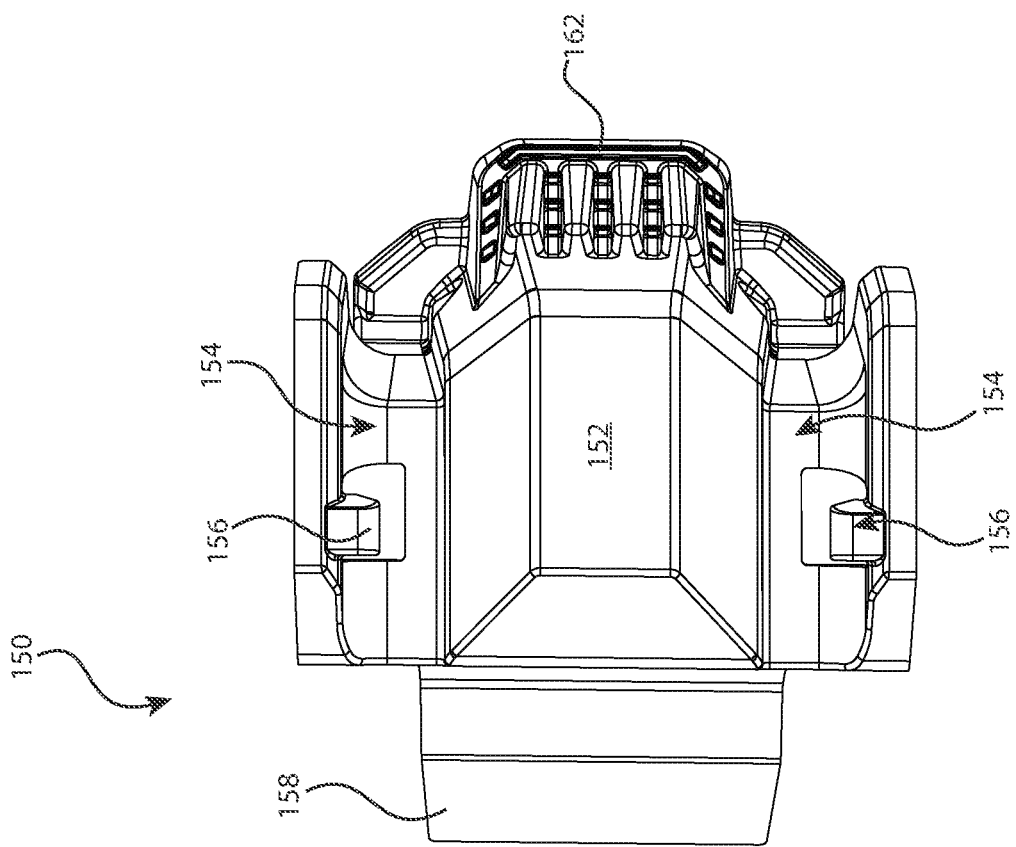
FIG. 13B
FIG. 13A

CLIP ASSEMBLY AND WINDSHIELD ASSEMBLY FOR SELECTIVELY CONNECTING A WINDSHIELD TO A VEHICLE

CROSS-REFERENCE

The present application claims priority to U.S. Provisional Patent Application No. 62/560,480, entitled "Clip Assembly and Windshield Assembly for Selectively Connecting a Windshield to a Vehicle", filed on Sep. 19, 2017, the entirety of which is incorporated herein by reference.

FIELD OF TECHNOLOGY

The present technology relates generally to a clip assembly and windshield assembly for selectively connecting a windshield to a vehicle.

BACKGROUND

Off-road side-by-side vehicles typically have a roll cage surrounding the cockpit area of the vehicle. These vehicles are often not provided with a windshield. These vehicles are often provided with half-doors or fabric and/or net doors, or no doors in some cases.

However, some users prefer to have a windshield. Such windshields are often mounted to the frame members of the roll cage. Other users decide to install a windshield or not on the vehicle depending on the expected riding conditions.

Many systems use clamps to mount the windshield to the roll cage. Although these permit the installation and removal of the windshield, they often require the use of tools which can be impractical and time consuming. Additionally, the hardware used with the clamps (i.e. nuts, bolts, washers, etc.) to attach the windshield and the clamps to the roll cage can be dropped and lost by the user during installation and/or removal.

Further, some users prefer to have a full doors which extend up to a top of the roll cage, along with the optionally mounted windshield. However, many clamps for selectively installing a windshield wrap around most or all of the surface of roll cage members. This generally impedes the installation or use of such doors for the vehicle, as the doors cannot close flush against the roll cage members. For example, some such systems include straps or loops for securing the windshield and/or the clamps in place.

There is therefore a desire for a system for securely installing a windshield to a roll cage of a vehicle that does not require the use of tools, and which further does not impede installation of optional doors on the vehicle.

SUMMARY

It is an object of the present technology to ameliorate at least some of the inconveniences present in the prior art.

According to an aspect of the present technology, there is provided a clip assembly, and a windshield assembly including a windshield and corresponding clip assemblies, for selectively providing a windshield for a vehicle. The windshield and the roll cage of the vehicle are provided with apertures for receiving opposite ends of a corresponding clip assembly. As the clip assembly is in the form of an overcenter latch which fastens into apertures in the roll cage member, the clip assembly is not required to wrap around a circumference of the roll cage members in order to secure the windshield to the vehicle. As such, the roll cage member can provide a sealing surface for a full door of the vehicle and installation of the windshield does not impede installation of an optional door. The overcenter latch of the clip assembly further permits the windshield assembly to be quickly and easily latched directly to roll cage members by the clip assemblies, without tools.

According to one aspect of the present technology, there is provided a clip assembly for selectively connecting a windshield to at least one frame member of a vehicle, the at least one frame member defining at least one frame aperture, the windshield defining at least one windshield aperture. The clip assembly includes a windshield member including a windshield member head larger than a corresponding portion of the at least one windshield aperture, and a windshield member body extending from the windshield member head, the windshield member body being sized and shaped for passing through the at least one windshield aperture; a vehicle member for partially inserting into the at least one frame aperture, the vehicle member including a vehicle member body, and a projection extending from the vehicle member body, the projection extending through the at least one frame aperture when the windshield is connected to the at least one frame member by the clip assembly, the projection defining a pivot axis about which the vehicle member pivots with respect to the at least one frame member when transitioning between a latched position and an unlatched position; and a connecting member selectively connected between the windshield member body and the vehicle member body, the windshield member, the connecting member, and the vehicle member forming an overcenter latch.

In some implementations of the present technology, a first end of the connecting member defines a first axis about which the connecting member pivots with respect to the windshield member, the first axis being parallel to the pivot axis; a second end of the connecting member defines a second axis about which the connecting member pivots with respect to the vehicle member, the second axis being parallel to the pivot axis; in the latched position, a line extending from the first axis to the second axis is disposed on a first side of the pivot axis, the line being normal to the pivot axis; and in the unlatched position, the line is disposed on a second side of the pivot axis opposite the first side.

In some implementations of the present technology, the projection of the vehicle member is curved such that a distal end of the projection extends generally toward the windshield member.

In some implementations of the present technology, the projection at least partially forms a curve centered about the pivot axis.

In some implementations of the present technology, the windshield member body defines a slot for receiving an upper portion of the connecting member; and the vehicle member body defines at least one groove for receiving a lower portion of the connecting member.

In some implementations of the present technology, the at least one groove is a first groove; the vehicle member further defines a second groove; the vehicle member further comprises a first protrusion and a second protrusion; and the first protrusion extends partially over the first groove and the second protrusion extends partially over the second groove, the protrusions being adapted for aiding in maintaining the connecting member in the grooves when the clip assembly is in the latched position.

In some implementations of the present technology, the windshield member body includes at least one protrusion extending into the slot to aid in keeping the connecting member in the slot.

In some implementations of the present technology, the connecting member is a rigid wire.

In some implementations of the present technology, the rigid wire is bent near a central region of the rigid wire such that one portion of the rigid wire is generally aligned with the windshield member body, and an other portion of the rigid wire is generally aligned with the vehicle member body.

In some implementations of the present technology, the vehicle member body has a vehicle abutting surface; the vehicle abutting surface being sized and shaped to contacts a clip surface of the at least one frame member when the windshield is connected to the at least one frame member by the clip assembly and the clip assembly is in the latched position; and the vehicle abutting surface is spaced from the clip surface when the clip assembly is in the unlatched position.

In some implementations of the present technology, the vehicle abutting surface is at least partially concave.

According to another aspect of the present technology, there is provided a windshield assembly for selectively connecting to at least one frame member of a vehicle, the at least one frame member defining at least one frame aperture. The windshield assembly includes a windshield defining at least one windshield aperture; and at least one clip assembly including a windshield member including a windshield member head larger than a corresponding portion of the at least one windshield aperture, and a windshield member body extending from the windshield member head, the windshield member body being sized and shaped for passing through the at least one windshield aperture; a vehicle member for partially inserting into the at least one frame aperture including a vehicle member body, and a projection extending from the vehicle member body, the projection extending through the at least one frame aperture when the windshield is connected to the at least one frame member by the clip assembly, the projection defining a pivot axis about which the vehicle member pivots with respect to the at least one frame member when transitioning between a latched position and an unlatched position; and a connecting member selectively connected between the windshield member body and the vehicle member body, the windshield member, the connecting member, and the vehicle member forming an overcenter latch.

In some implementations of the present technology, a first end of the connecting member defines a first axis about which the connecting member pivots with respect to the windshield member, the first axis being parallel to the pivot axis; a second end of the connecting member defines a second axis about which the connecting member pivots with respect to the vehicle member, the second axis being parallel to the pivot axis; in the latched position, a line extending from the first axis to the second axis is disposed on a first side of the pivot axis, in the latched position, the line extending at least partially through the at least one frame member; and in the unlatched position, the line is disposed on a second side of the pivot axis opposite the first side, the line being normal to the pivot axis.

In some implementations of the present technology, the at least one windshield aperture is a first windshield aperture; the at least one frame member is first frame member; the at least one frame aperture is a first frame aperture; the at least one clip assembly is a first clip assembly; the first clip assembly fastens the windshield to the vehicle using the first windshield aperture and the first frame aperture of the first frame member; the vehicle further includes a second frame member defining a second frame aperture, the second frame member being disposed on an opposite lateral side of the vehicle from the first frame member; the windshield further defines a second windshield aperture on a lateral side of the windshield opposite the first windshield aperture; the windshield assembly further comprises a second clip assembly; and the second clip assembly further fastens the windshield to the vehicle using the second windshield aperture and the second frame aperture of the second frame member.

In some implementations of the present technology, the at least one windshield aperture is a plurality of windshield apertures; the at least one frame aperture is a plurality of frame apertures; the at least one clip assembly is a plurality of clip assemblies; each clip assembly fastens the windshield to the vehicle using one of the plurality of windshield apertures and a corresponding one of the plurality of frame apertures.

In some implementations of the present technology, the windshield assembly further includes a resilient sealing member disposed near at least a portion of an edge of the windshield.

According to yet another aspect of the present technology, there is provided a vehicle including a frame; at least two ground engaging members operatively connected to the frame: a motor connected to the frame and operatively connected to at least one of the at least two ground engaging members; at least one seat connected to the frame; and the windshield assembly according to the above aspects selectively connected to the frame, the frame including the at least one frame member defining the at least one frame aperture.

In some implementations of the present technology, the at least one frame member includes at least a windshield sealing surface, a door sealing surface, and a clip surface extending between the windshield sealing surface and the door sealing surface; the at least one frame aperture is defined in the clip surface; and when the windshield is connected to the vehicle and the windshield abuts the windshield sealing surface, the at least one clip assembly does not extend past an edge of the door sealing surface such that the at least one clip assembly does not impede a door moveably connected to the vehicle from smoothly contacting the door sealing surface.

In some implementations of the present technology, the vehicle member body has a vehicle abutting surface; the vehicle abutting surface contacts the clip surface when the windshield is connected to the at least one frame member by the clip assembly and the clip assembly is in the latched position; and the vehicle abutting surface is spaced from the clip surface when the clip assembly is in the unlatched position.

In some implementations of the present technology, the vehicle member is shaped such that the vehicle abutting surface lies flush with the clip surface when the clip assembly is in the latched position.

For purposes of the present application, terms related to spatial orientation such as front, rear, up, down, left and right are to be understood as they would be understood by a driver of a vehicle sitting therein in a normal driving position. However, when referring to the clip assembly alone, terms related to spatial orientation should be understood from a frame of reference where a front of the clip assembly corresponds to a head portion of the windshield member of the clip assembly and a rear of the clip assembly corresponds to a gripping portion of the vehicle member of the clip assembly.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 is a close-up, exploded, partial view of the windshield assembly of FIG. 5;

FIG. 13A is a left side elevation view of a vehicle member of the clip assembly of FIG. 8;

FIG. 13B is a top, rear, right side perspective view of the vehicle member of FIG. 13A;

DETAILED DESCRIPTION

The present technology will be described with respect to an implementation of an off-road side-by-side vehicle. It is contemplated however that the present technology could be used on other implementations of off-road side-by-side vehicle or on other types of vehicles. The present also describes clip assemblies used for connecting a windshield to a roll cage of a vehicle.

Figure 1:
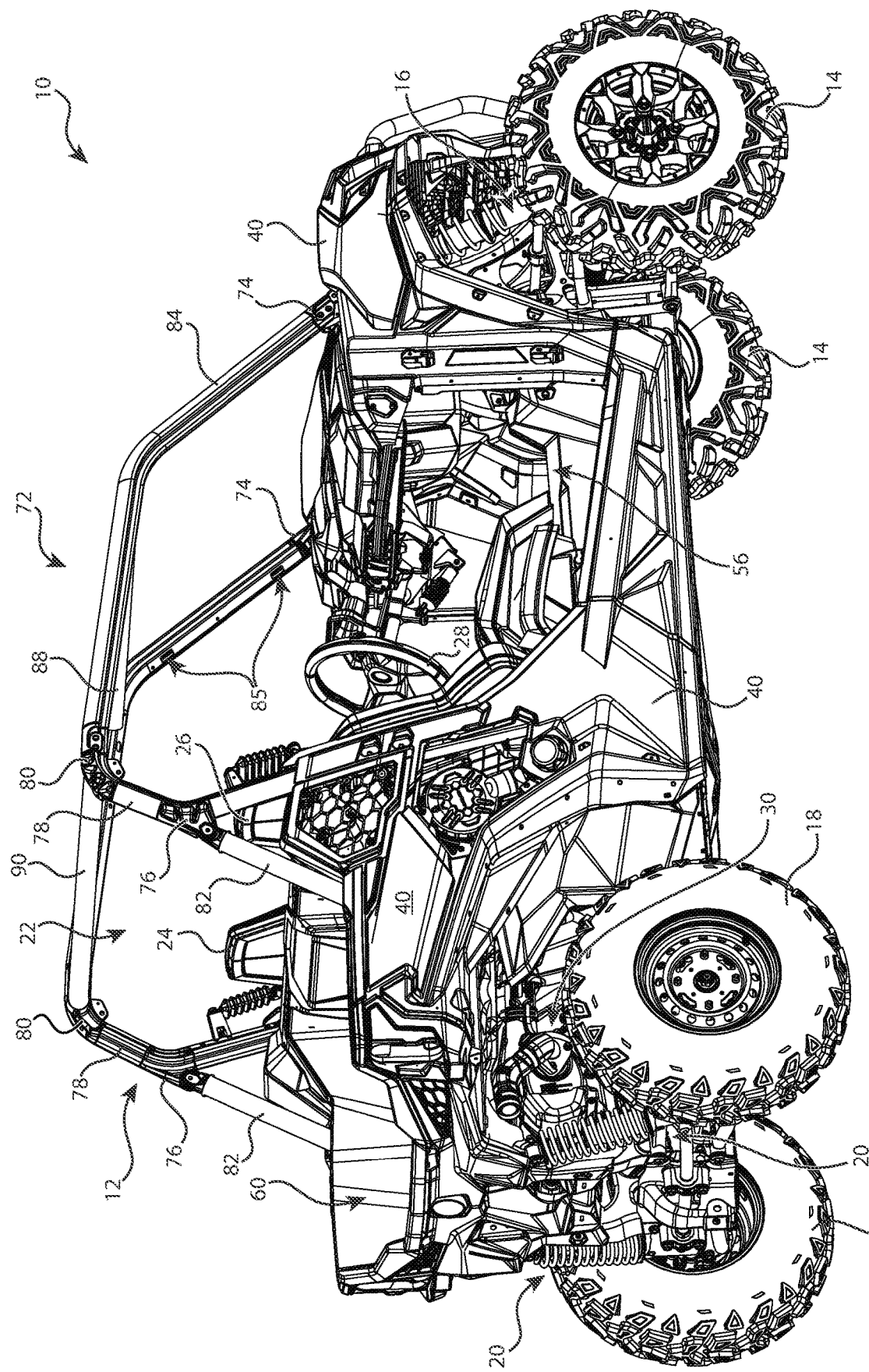
FIG. 1 is a perspective view, taken from a rear, right side of an off-road side-by-side vehicle.

The general features of the off-road vehicle 10 will be described with respect to FIGS. 1 and 2. The vehicle 10 has a frame 12, two front wheels 14 connected to a front of the frame 12 by front suspension assemblies 16 and two rear wheels 18 connected to the frame 12 by rear suspension assemblies 20.

The frame 12 is made from a plurality of hollow steel frame members and steel brackets that are welded to each other. Some frame members are cylindrical, while some have flattened surfaces as will be described in more detail below. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10.

A motor 30, specifically an internal combustion engine 30, is connected to the frame 12 in a rear portion of the vehicle 10. The engine 30 is connected to a continuously variable transmission (CVT, not shown) disposed on a left side of the engine 30. The CVT is operatively connected to a transaxle (not shown) to transmit torque from the engine 30 to the transaxle. The transaxle is disposed behind the engine 30. The transaxle is operatively connected to the front and rear wheels 14, 18 to propel the vehicle 10. It is contemplated that other types of motors 30 could be used. For example, it is contemplated that the motor 30 could be an electric motor.

The vehicle 10 includes body panels 40 connected to the frame 12. The panels 40 help protect the internal components of the vehicle 10 and provide some of the aesthetic features of the vehicle 10. Rearward panels 40 partially define a cargo space 60 therebetween behind the seats 24, 26. On each side of the vehicle 10, the panels 40 define a passage 56 through which a rider (driver or passenger depending on the side of the vehicle 10) can enter or exit the vehicle 10. As will be described further below, each side of the vehicle 10 can optionally be provided with a door 54 (shown schematically in FIG. 16) moveably connected to the frame 12 that selectively closes a portion of the corresponding passage 56.

With continued reference to FIGS. 1 and 2, the frame 12 of the vehicle 10 will be described in further detail. A central portion of the frame 12 defines a roll cage 72. The roll cage 72 is made of various frame members, including legs and cross-members, as described below. The roll cage 72 is connected at its front to brackets 74 and at its rear to brackets 76. In the present implementation, the roll cage 72 is welded to the brackets 74 and 76, but other connection methods are contemplated. It is contemplated that the roll cage 72 could have more or less members and brackets than described below depending on the type of materials used, the required strength and rigidity of the roll cage 72 for example.

The roll cage 72 includes two legs 78 connected to and extending upward and forward from the brackets 76. The upper ends of the legs 78 are received in and connected to connectors 80. The frame 12 includes two legs 82 whose upper ends are received in the brackets 76. From the brackets 76, the legs 82 extend downward and rearward and connect at their lower ends to a cross-member (not shown) supporting the floor of the cargo space 60.

The roll cage 72 also includes legs 84 connected to and extending upward and rearward from the brackets 74. The upper ends of the legs 84 are received in and connected to the connectors 80. The legs 84 are bent near their center points. A front cross-member 88 is connected to and extends between the legs 84. The cross-member 88 is connected to the legs 84 at points disposed slightly rearward of the bends in the legs 84. A rear cross-member 90 is connected to and extends between the connectors 80 at the rear ends of the legs 84. The cross-member 90 is disposed rearward of the cross-member 88. The cross-member 90 is connected to the legs 84 at points disposed forward of the upper ends of the legs 78.

Figure 2:
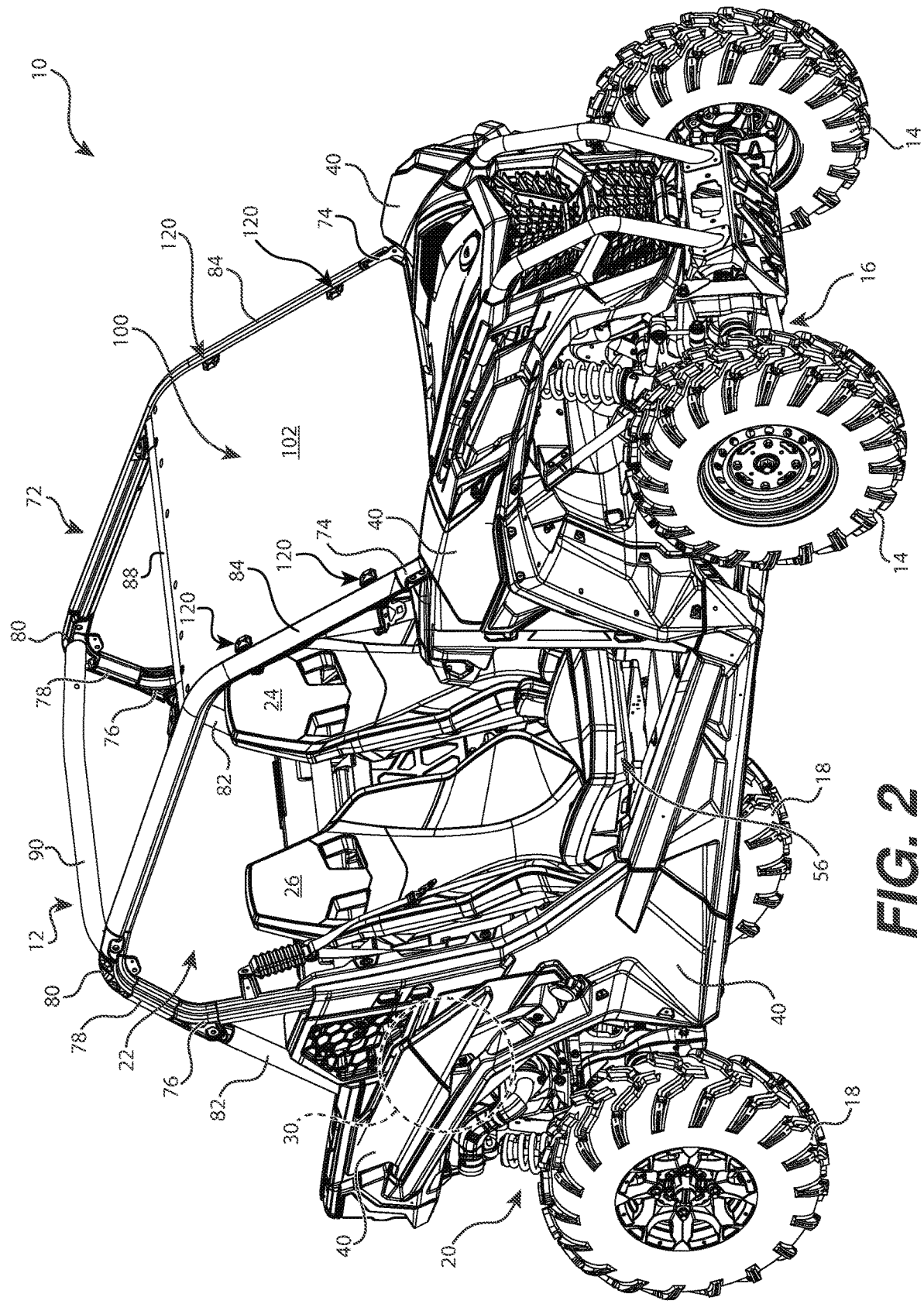
FIG. 2 is a perspective view, taken from a front, right side of the vehicle of FIG. 1, with a windshield installed on a roll cage of the vehicle.
Figure 3:
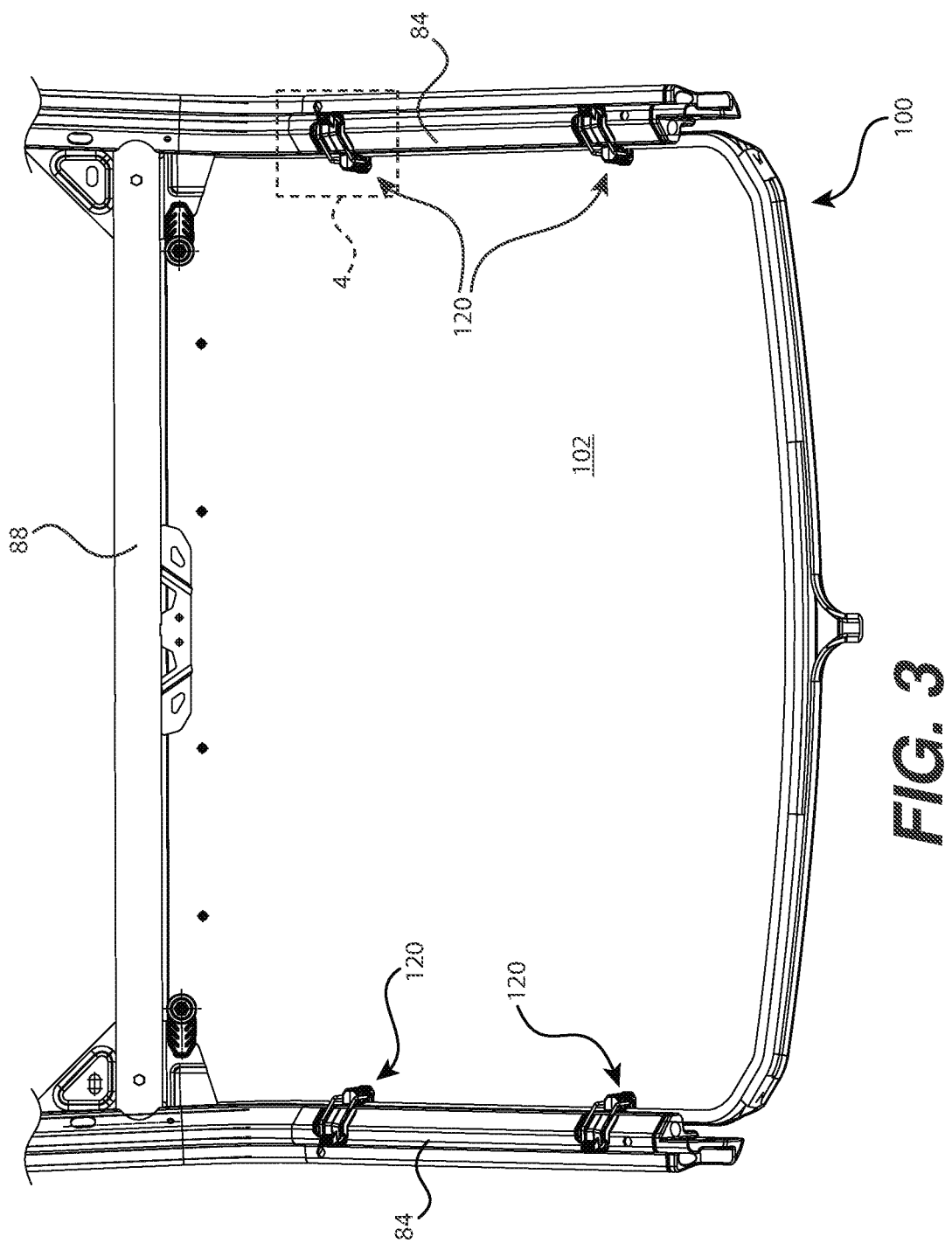
FIG. 3 is a rear side perspective view of a windshield assembly, including the windshield, and a portion of the roll cage of the vehicle of FIG. 2.

In accordance with the present technology, the vehicle 10 is provided with a windshield assembly 100 that is selectively connected to the frame 12 to provide a windshield 102, as is illustrated in FIG. 2. The windshield assembly 100 includes the windshield 102 and four clip assemblies 120 for selectively connecting the windshield 102 to the vehicle 10. As such, a user of the vehicle 10 has the option of installing the windshield 102 as shown in FIG. 2 or of removing the windshield 102 and using the vehicle 10 without the windshield 102 as shown in FIG. 1. The windshield 102 and the clip assemblies 120 will be described in more detail below.

The windshield assembly 100, when connected to the vehicle 10, is disposed on and fastened to the legs 84 by two clip assemblies 120 per leg 84, which will now be described in more detail with reference to FIGS. 1 and 14 to 16. The legs 84 are hollow, generally hour-glass shaped steel frame members 84. Each leg 84 has a clip surface 87 which is disposed within the cockpit area 22. The clip surface 87 of each leg 84 defines two apertures 85, one per clip assembly 120, for selectively fastening the windshield assembly 100 to the vehicle 10, as will be described below. It is contemplated that the legs 84 could be provided with one or more than two apertures 85, depending on the number of clip assemblies 120.

On a forward side, each leg 84 also has a windshield sealing surface 89 for receiving the windshield 102 of the windshield assembly 100. On an outward facing side of each leg 84, specifically a right side of the right leg and a left side of the left leg 84, there is a door sealing surface 91 for selectively receiving the door 54 which could be moveably and selectively connected to the vehicle 10 in some implementations. The clip surface 87 extends between the windshield sealing surface 89 and the door sealing surface 91.

The windshield 102 will now be described in reference to FIGS. 2 to 7. The windshield 102 defines upper and lower left apertures 104 and upper and lower right apertures 104. In the present implementation, the apertures 104 are shaped like irregular hexagons, but other shapes, including rectangular, square, and other polygonal and non-polygonal shapes, are contemplated. The four clip assemblies 120 are inserted through the apertures 104 to secure the windshield 102 to the legs 84 as will be described in greater detail below. It is contemplated that the windshield 102 could define only one or more than two apertures 104 per side in which case a corresponding number of clip assemblies 120 and a corresponding number of apertures 85 in the legs 84 would be provided. It is also contemplated that the windshield 102 could define one or more apertures 104 near an upper edge thereof such that a corresponding number of clip assemblies 120 could be used to fasten the windshield 102 onto the cross-member 88. It is further contemplated that the windshield 102 could provide one or more apertures 104 on only one side, and that the opposing side of the windshield 102 could be secured to the frame 12 by, for example, inserting that side into a slot in the leg 84 adapted for receiving the edge of the windshield 102.

Figure 5:
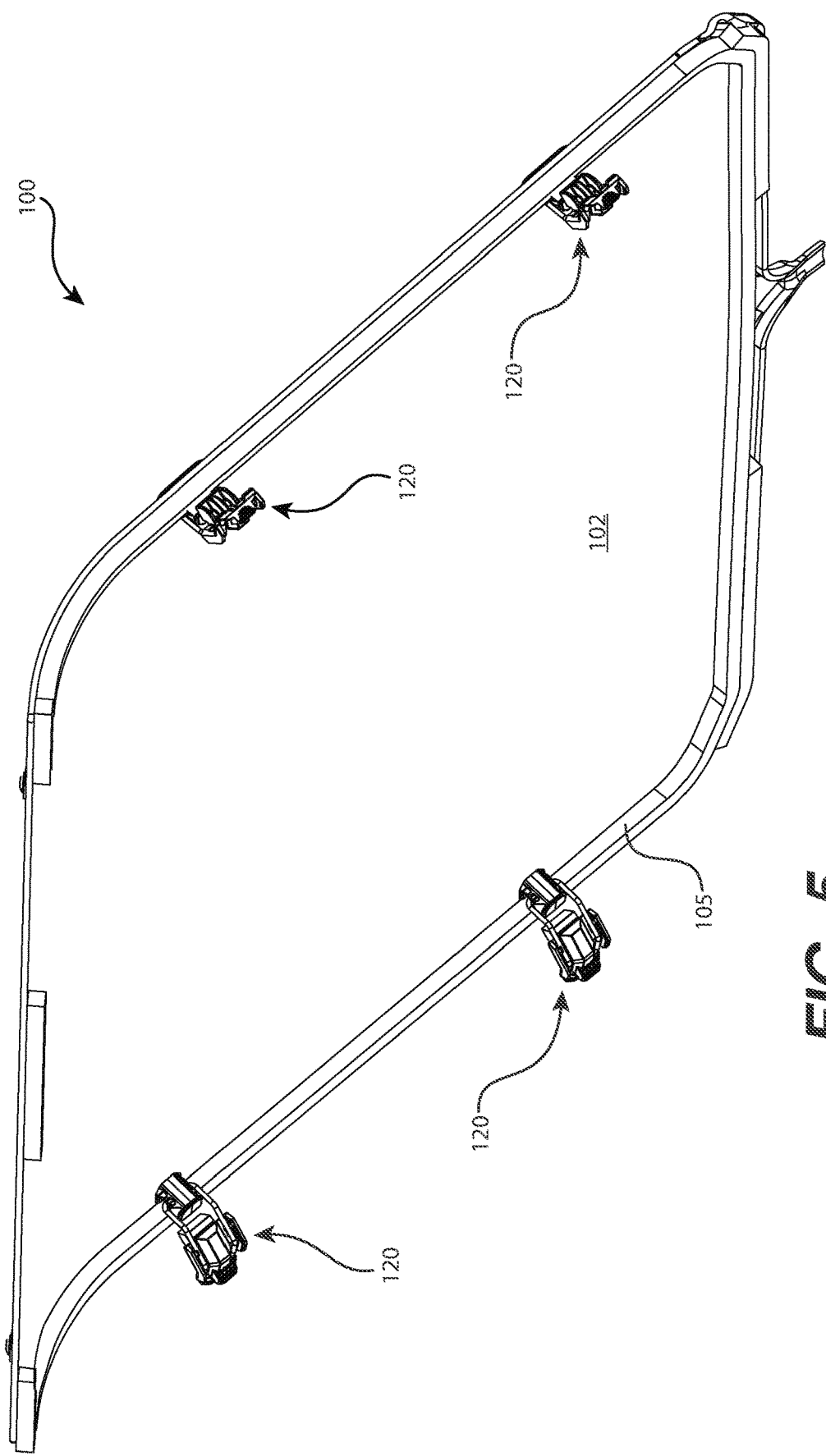
FIG. 5 is a rear, right side perspective view of the windshield assembly of FIG. 3, with the portion of the roll cage removed.
Figure 6:
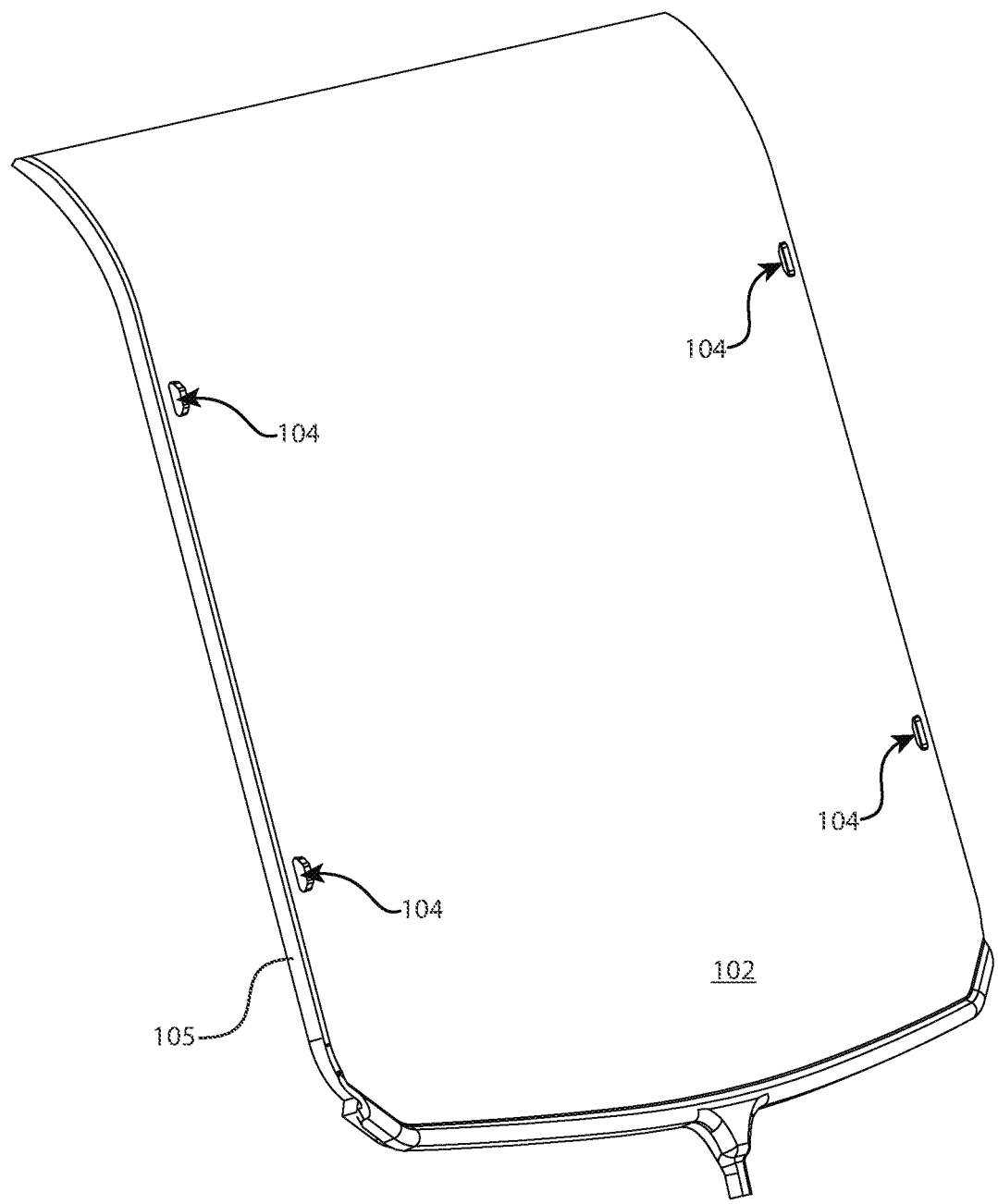
FIG. 6 is a front, right side perspective view of the windshield of the windshield assembly of FIG. 5, with the windshield shown in isolation.
Figure 8:
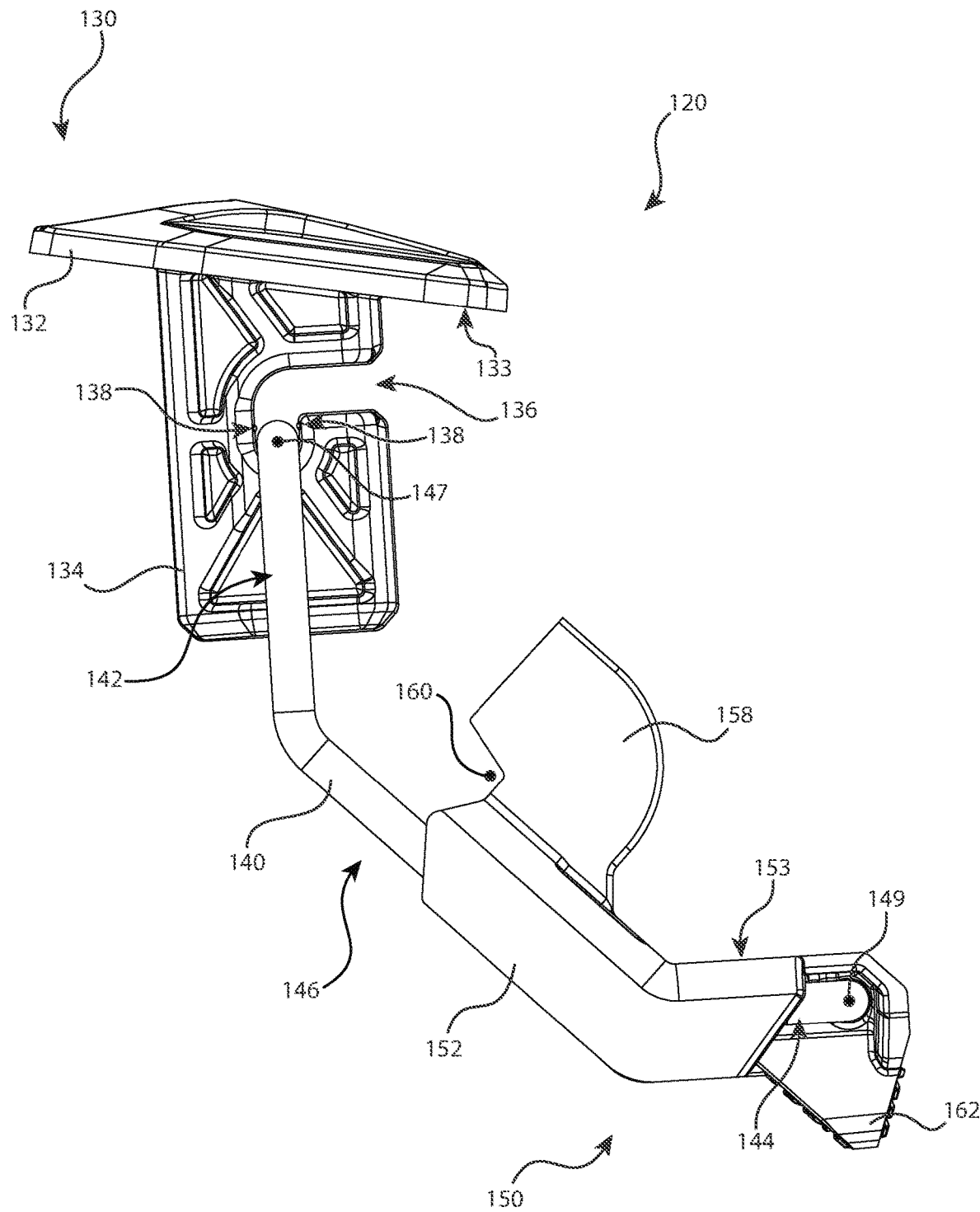
FIG. 8 is a top plan view of a right clip assembly of the windshield assembly of FIG. 5.
Figure 9:
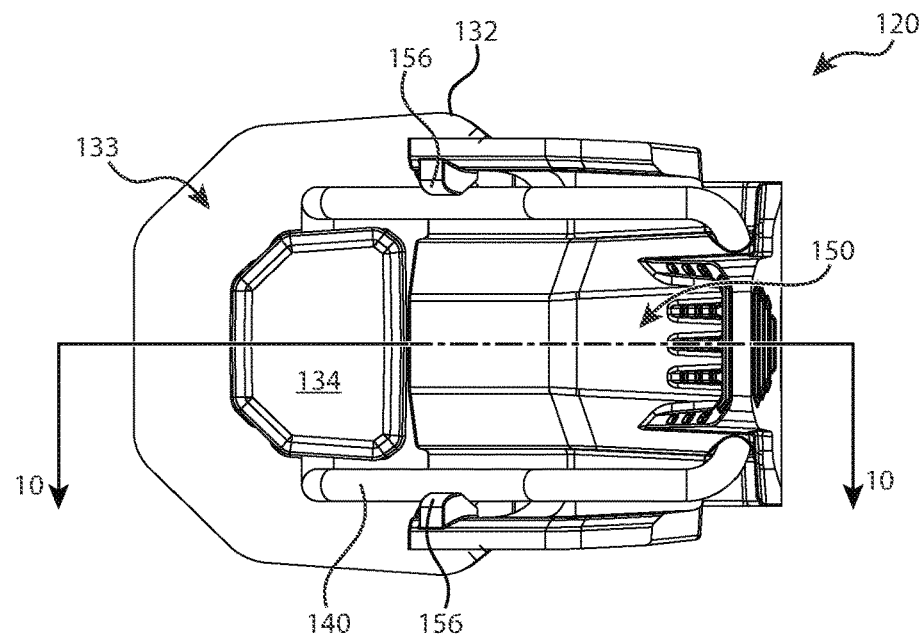
FIG. 9 is a rear side elevation view of the clip assembly of FIG. 8.
Figure 10:
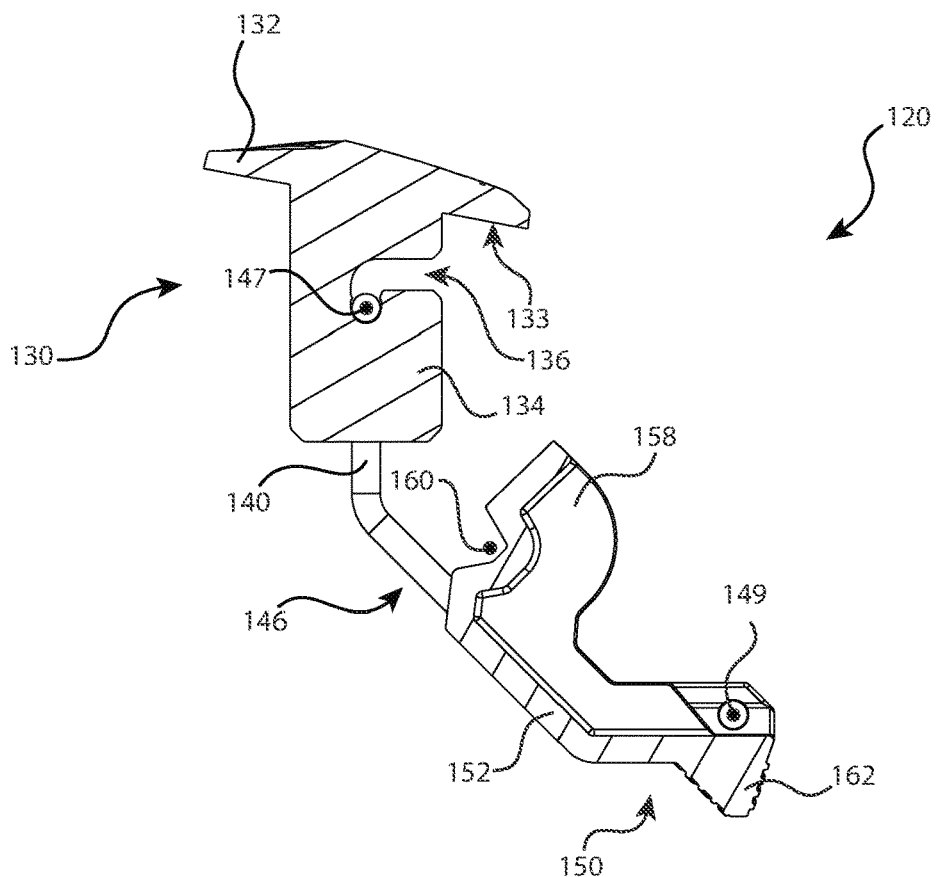
FIG. 10 is a cross-sectional view of the clip assembly of FIG. 9, taken along line 10-10 of FIG. 9.
Figure 11B:
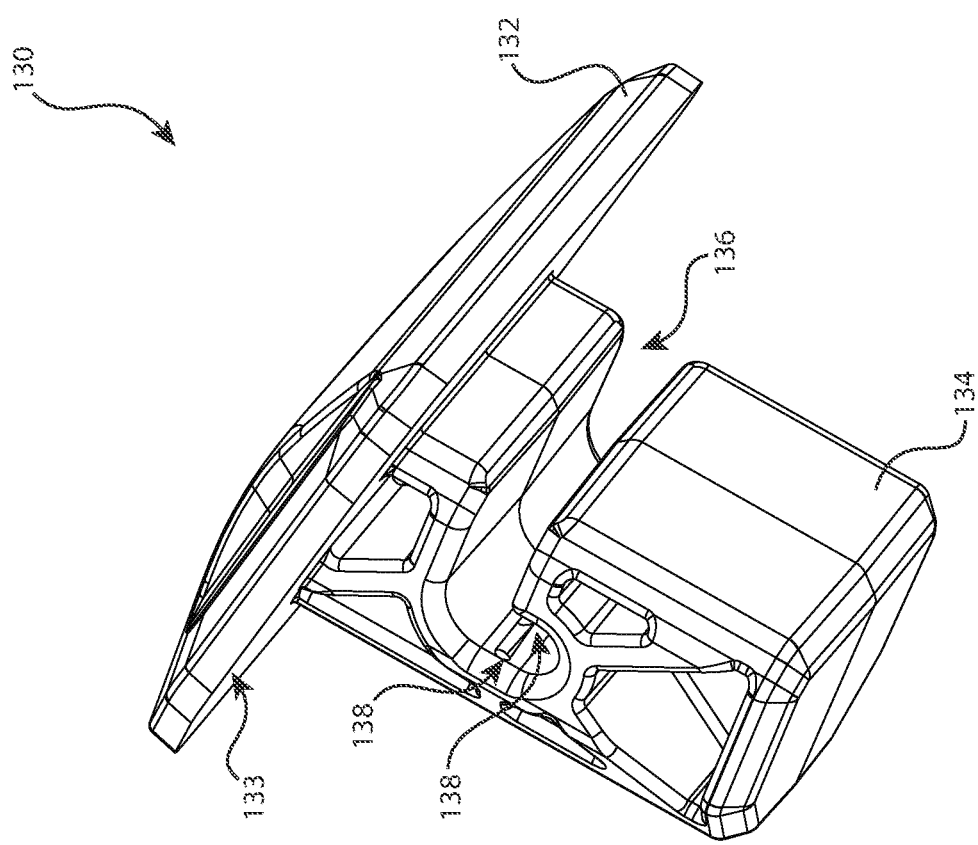
FIG. 11B is a top, rear, right side perspective view of the windshield member of FIG. 11A.
Figure 11A:
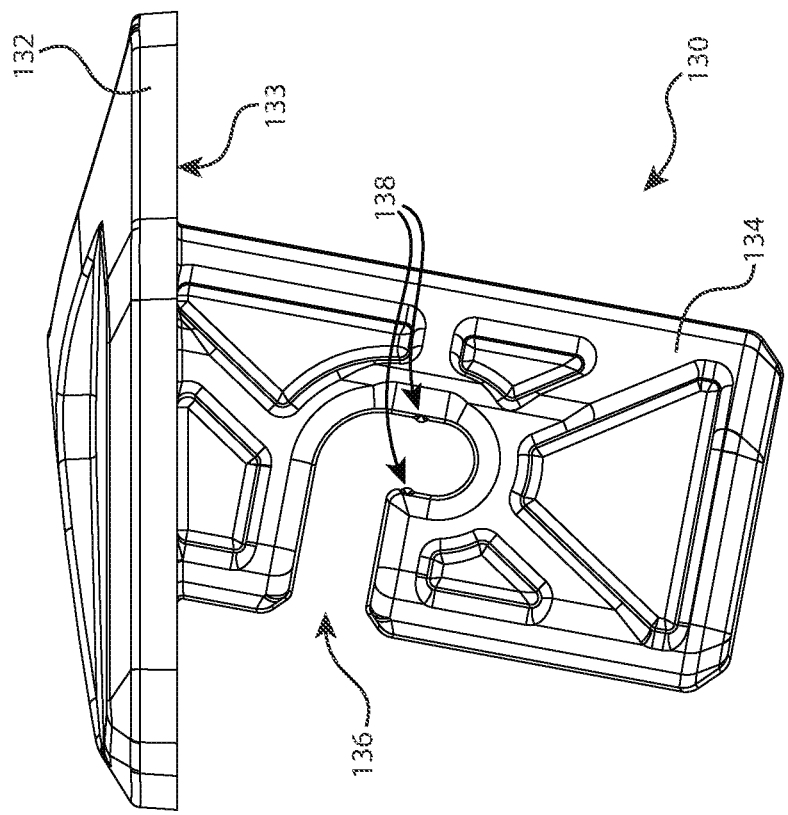
FIG. 11A is a bottom plan view of a windshield member of the clip assembly of FIG. 8.
Figure 11D:
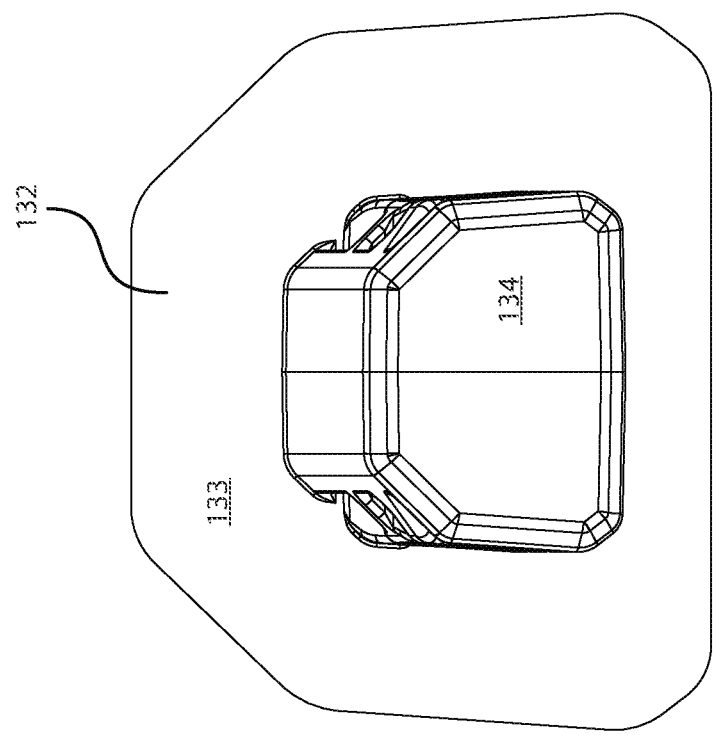
FIG. 11D is a rear elevation view of the windshield member of FIG. 11A.
Figure 11C:
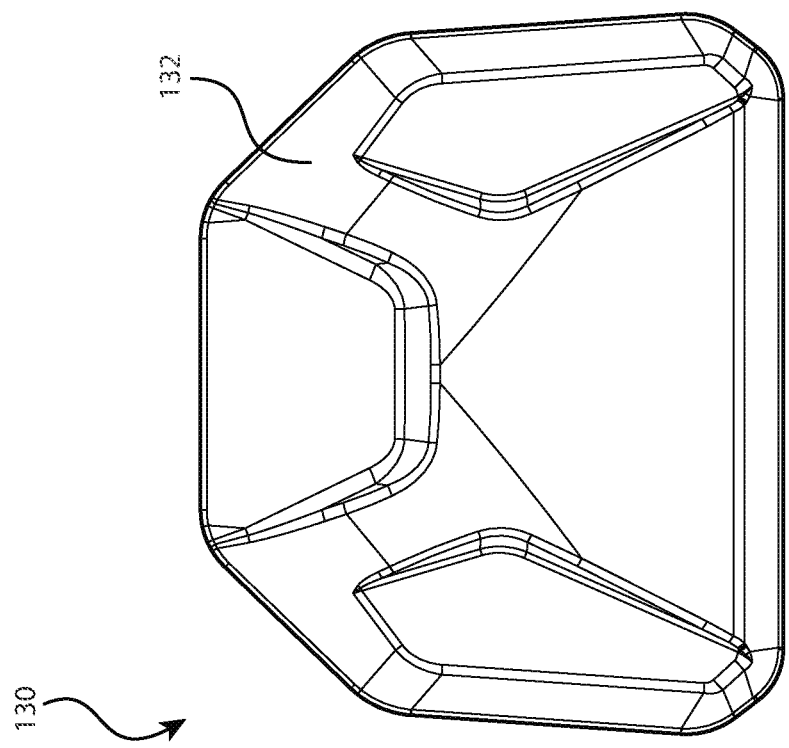
FIG. 11C is a front elevation view of the windshield member of FIG. 11A.

As can be seen in FIGS. 5 and 6, the windshield 102 has a resilient sealing member 105 disposed on an inside surface and near the edge of the windshield 102. The sealing member 105 extends along both left and right edges of the windshield 102, as well as the bottom edge and portions of the top edge of the windshield. It is contemplated, however, that the sealing member 105 could be disposed along more or less of the edge of the windshield 102, depending on the specific implementation.

The sealing member 105 is a partially compressible rubber seal for aiding in preventing water and/or dust from passing between the windshield 102 and the legs 84, as well as for providing some cushioning between the windshield 102 and the legs 84. It is contemplated that a different material could be used depending on the implementation, including but not limited to foam. As will be described in more detail below, the sealing member 105 is at least partially compressible to aid in the fastening of the windshield 102 to the legs 84 using the clip assemblies 120.

With reference to FIGS. 8 to 13B, the upper right clip assembly 120 will be described in more detail. The lower right clip assembly 120 is identical to the upper right clip assembly 120 and the upper left and lower left clip assemblies 120 are mirror images of the upper right clip assembly 120, and as such will not be described in detail herein. It is contemplated that in some implementations of the windshield assembly 100, there could be differences between the clip assemblies 120.

The clip assembly 120 is made up of three selectively connected portions: a windshield member 130, a connecting member 140, and a vehicle member 150. The connecting member 140 is removably and pivotably connected at a front end to the windshield member 130. At a second end, rearward and rightward from the front end, the connecting member 140 is removably and pivotably connected to the vehicle member 150. It is contemplated that in some implementations, the connecting member 140 and the vehicle member 150 could be pivotably, but not removably, connected.

The windshield member 130, the connecting member 140, and the vehicle member 150 together form an overcenter latch for selectively securing the windshield 102 to the legs 84. As will be described below in more detail, when the windshield assembly 100 is disposed on the vehicle 10, the clip assembly 120 is moveable between at least an unlatched position (illustrated in FIG. 14) and a latched position (illustrated in FIGS. 4 and 16).

With reference to FIGS. 8 to 11D, the windshield member 130 is the windshield contacting portion of the clip assembly 120. The windshield member 130 and its corresponding components are named in this manner since the object being fastened to the vehicle 10 is the windshield 102.

The windshield member 130 is formed from rigid polycarbonate, but other materials are contemplated, including but not limited to: rubber and hardened plastic. It is also contemplated that different portions of the windshield member 130, described below, may be made from multiple materials and/or components which are fastened, glued, or otherwise connected together.

Figure 4:
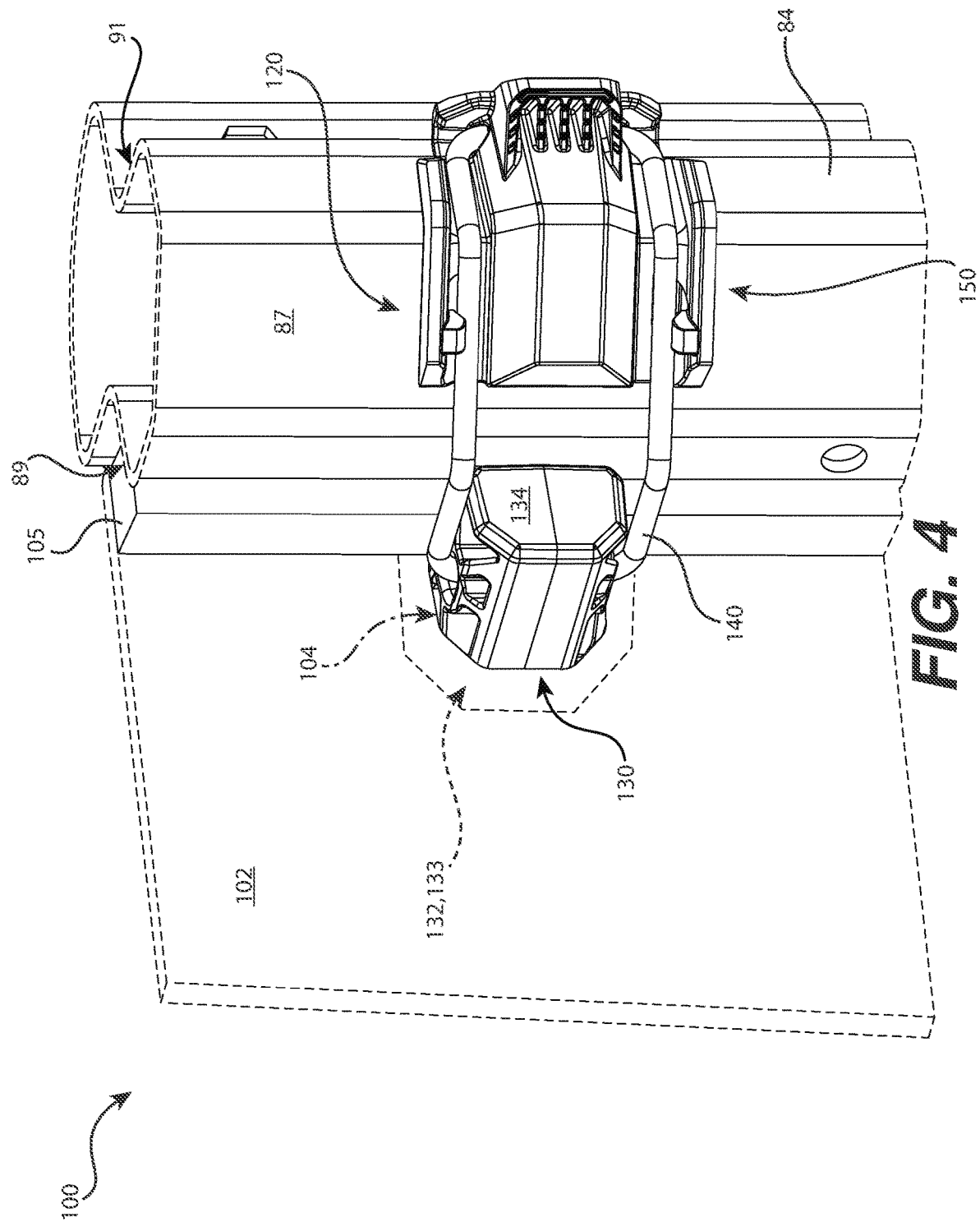
FIG. 4 is a close-up view of a portion of the windshield assembly and a portion of the roll cage of FIG. 3, taken from portion 4 of FIG. 3.

The windshield member 130 includes a windshield member head 132. The windshield member head 132 is hexagonally shaped, similarly to, but with larger dimensions, as the windshield apertures 104, but this is not limiting. It is contemplated that the windshield member head 132 could be implemented in any number of shapes, including but not limited to: circular, rectangular, and any polygonal or non-polygonal shape. The rearward surface 133 of the windshield member head 132 is referred to herein as the windshield contacting surface 133. When the clip assembly 120 is installed as seen in FIG. 4, the windshield contacting surface 133 makes contact with an outer surface of the windshield 102 surrounding the aperture 104. As such, the windshield member 130 grips an exterior, front surface of the windshield 102, and the windshield member body 134 is attached to the remaining portions of the clip assembly 120.

The windshield member 130 also includes a windshield member body 134 extending rearward from the windshield member head 132. The windshield member body 134 is sized and shaped to pass through the windshield aperture 104. The windshield member body 134 could be differently shaped in some implementations, so long as the windshield member body 134 can fit through the windshield aperture 104.

The windshield member body 134 defines a slot 136 in a right side of the body 134 for selectively receiving the connecting member 140. As will be described in more detail below, during installation of the windshield assembly 100 on the vehicle 10, the windshield member 130 and the connecting member 140 need to be separated at one step in the process, and connected during a subsequent step. The slot 136 has a diameter slightly larger than that of the connecting member 140 to allow the connecting member 140 is be easily entered and removed from the slot 136. The slot 136 is generally L-shaped, such that the connecting member 140, when fully settled into the slot 136, is disposed rearward from an entrance of the slot 136. It is contemplated that the slot 136 could be differently shaped, including, but not limited to: having an arc-like form and having a straight slot extending diagonally rearward and away from the slot entrance.

While the connecting member 140 needs to be easily removed from the slot 136, the windshield member 130 and the connecting member 140 will also need to be manipulated while connected. The windshield member body 134 thus also includes two small protrusions 138 which extend into the slot 136. The protrusions 138 provide a slight barrier for preventing the connecting member 140 from sliding out of the slot 136. As such, the connecting member 140 stays generally in the slot 136 when the windshield member 130 and the connecting member 140 are connected, unless the connecting member 140 is pulled with a slight force to push past the protrusions 138, after which the connecting member 140 is easily slid out of the slot 136.

With reference to FIGS. 8 to 10, 12A, and 12B, the connecting member 140 of the clip assembly 120 will now be described in more detail. As mentioned above, the connecting member 140 is selectively connected between the windshield member 130 and the vehicle member 150.

The connecting member 140 is a rigid, steel, cylindrical wire formed into a generally rectangular form, bent in two places. It is contemplated that the connecting member 140 could be composed of material other than steel in some implementations, including but not limited to: another metal, hardened plastic, and polycarbonate. It is also contemplated that different shapes of rigid wire could be used. It is further contemplated that the connecting member 140 could be in a form other than a wire.

The connecting member 140 includes a forward portion 142 which is inserted into the slot 136 of the windshield member 130 (as mentioned above). Opposite the forward portion 144, the connecting member 140 also includes a rearward portion 144. The connecting member 140 is bent to generally conform to the shape of the vehicle member 150, as will be described in more detail below. A bottom end of the rearward portion 144 is split and includes two edges 145, corresponding to two ends of the wire 140, for inserting into the vehicle member 150. The connecting member 140 also includes a central region 146 extending between the two bends in the connecting member 140 defining the forward and rearward portions 142, 144. The forward portion 142 is generally aligned with the windshield member body 134 and the rearward portion 144 is generally aligned with the vehicle member body 152 when latched. Further, the connecting member 140 is bent such that the forward portion 142 and the rearward portion 144 are generally perpendicular to each other.

A front end of the forward portion 142 defines an axis 147 (illustrated in FIG. 12B), about which the connecting member 140 pivots with respect to the windshield member 130. A rear end of the rearward portion 144 defines an axis 149 about which the connecting member 140 pivots with respect to the vehicle member 150. The axes 147 and 149 are parallel to one another.

With reference to FIGS. 8 to 10 and 13A to 13D, the vehicle member 150 of the clip assembly 120 will now be described in more detail. The vehicle member 150, as the name suggests, is the portion of the clip assembly 120 that is connected to the vehicle 10; specifically the vehicle member 150 extends partially into the aperture 85 of the leg 84.

The vehicle member 150 is formed from rigid polycarbonate, but other materials are contemplated, including but not limited to: rubber and hardened plastic. It is also contemplated that different portions of the vehicle member 150 may be made from multiple materials and/or components which are fastened or glued together.

The vehicle member 150 includes a vehicle member body 152. On a front side, the vehicle member body 152 has a vehicle abutting surface 153 which contacts the clip surface 87 of the leg 84 when the clip assembly 120 is in the latched position. When the clip assembly 120 is in an unlatched position, the vehicle abutting surface 153 is spaced from the clip surface 87. The vehicle member body 152 has a v-like shape, with two generally straight portions connected by a curved portion. As such, the vehicle abutting surface 153 has a partially concave form which allows the vehicle abutting surface 153 to lie flush with the clip surface 87 and the leg 84 when the clip assembly 120 is in the latched position. It is contemplated that the vehicle member body 152 and the vehicle abutting surface 153 could be differently shaped depending on the specific implementation of the leg 84. It is also contemplated that the vehicle abutting surface 153 could lie flush with the clip surface 87 and the leg 84 along only a portion of its length.

Figure 16:
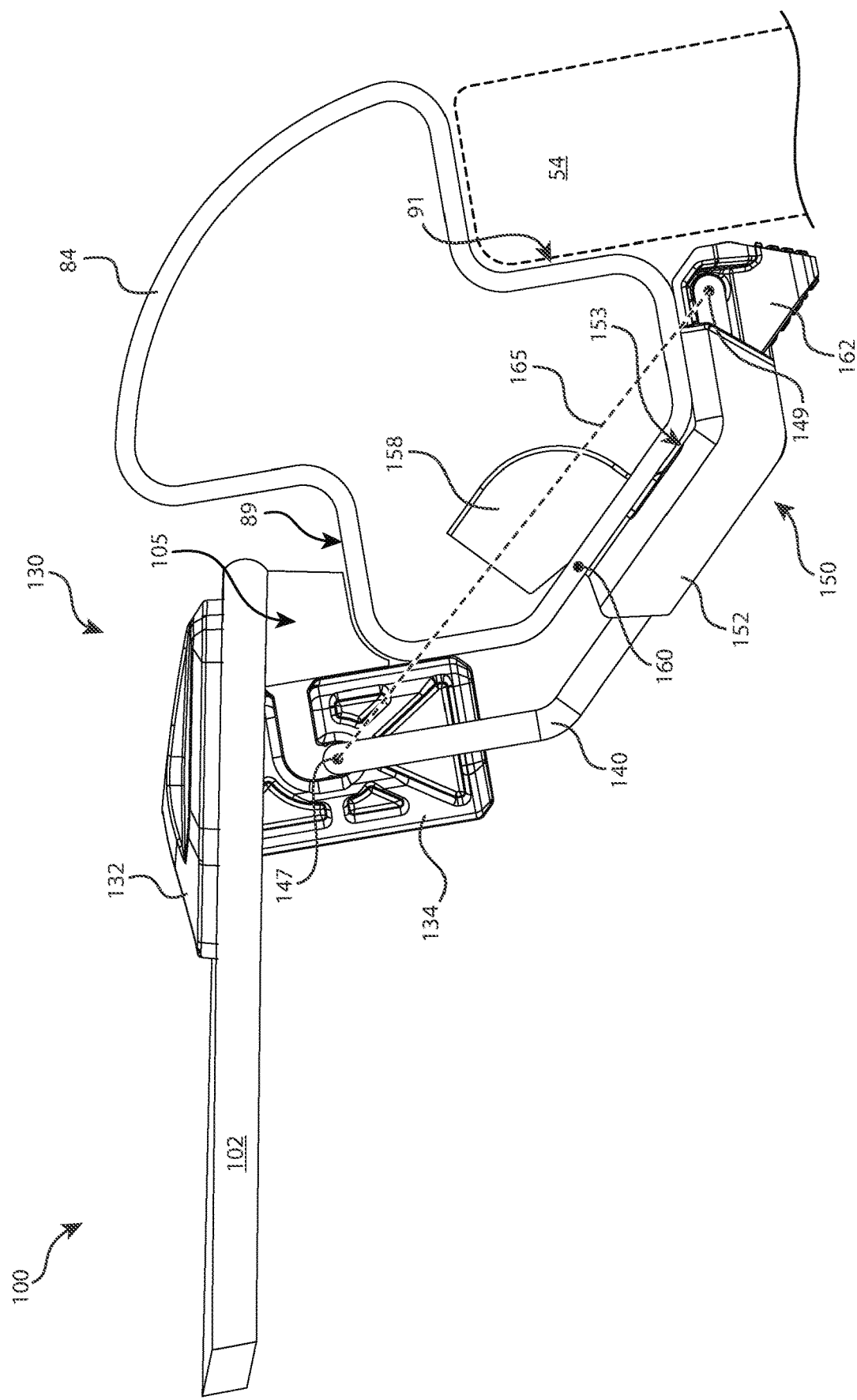
FIG. 16 is a top plan view of the portion of the windshield assembly and the portion of the roll cage of FIG. 14, with the clip assembly in a latched position.

As can be seen in FIG. 16, when the windshield 102 is connected to the vehicle 10 and the windshield 102 abuts the windshield sealing surface 89, the vehicle member 150 does not wrap around the entire leg 84. The clip assemblies 120 secure the windshield 102 to the roll cage 72, but without extending past an edge of the door sealing surface 91. The clip assemblies 120 thus do not impede the door 54 moveably connected to the vehicle 10 from contacting the door sealing surface 91.

As best seen in FIG. 13A, the vehicle member body 152, opposite the vehicle abutting surface 153, defines two grooves 154 for receiving the connecting member 140 when the clip assembly 120 is in the latched position. The vehicle member body 152 further includes two protrusions 156, one protrusion 156 extending partially over a corresponding one of the grooves 154 to aid in maintaining the connecting member 140 in the corresponding groove 154 when the clip assembly 120 is in the latched position. As will be described below, tension forces on the clip assembly 120 will tend to keep the clip assembly 120 in the latched position, but the protrusions 156 are an additional aid in maintaining the connecting member 140 in the grooves 154. The protrusions 156 will generally keep the connecting member 140 in the grooves 154 unless the connecting member 140 is pulled against the protrusions 156 sufficiently to deflect the protrusions 156.

At a right side end of each groove 154, the vehicle member body 152 defines a circular aperture 157 for receiving a corresponding one of the ends 145 of the connecting member 140. The ends 145 are removably inserted into the apertures 157, although it is contemplated that in some implementations the connecting member 140 and the vehicle member 150 could be adapted such that the two members 140, 150 are not meant to be separable.

Figure 12A:
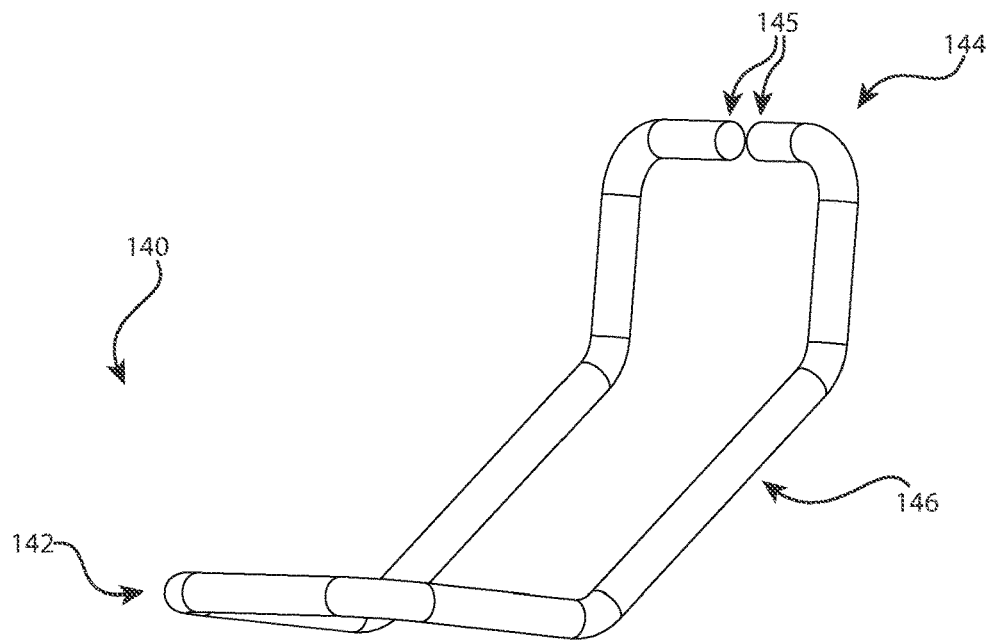
FIG. 12A is a top, front side perspective view of a connecting member of the clip assembly of FIG. 8.
Figure 12B:
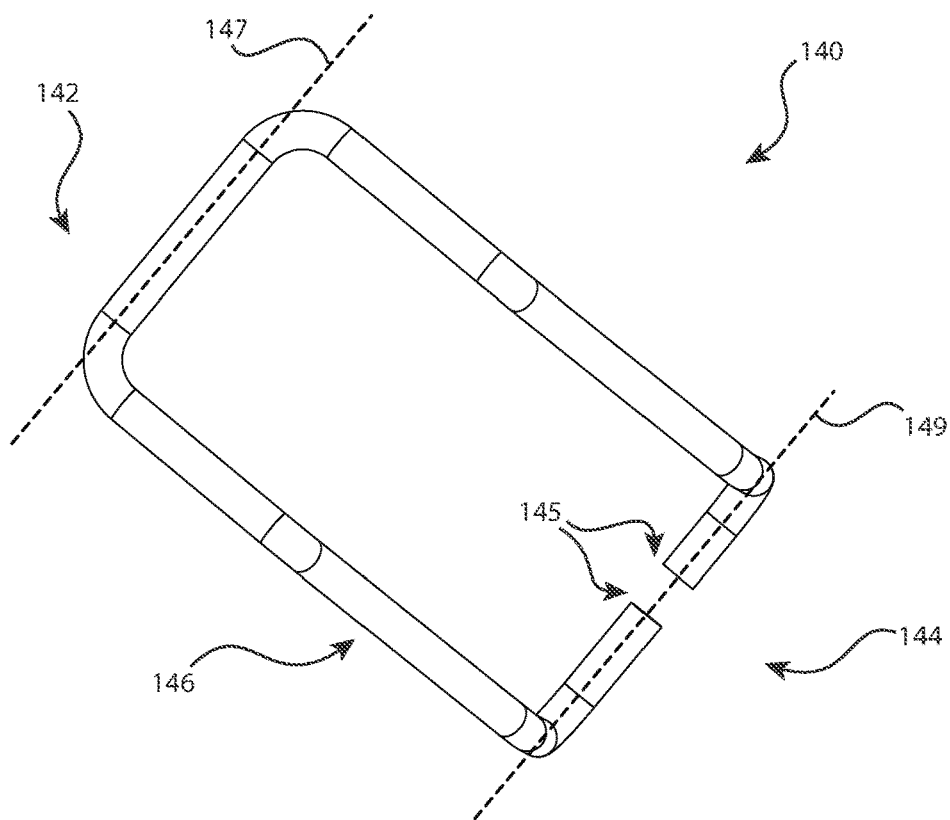
FIG. 12B is a left side elevation view of the connecting member of FIG. 12A.
Figure 13C:
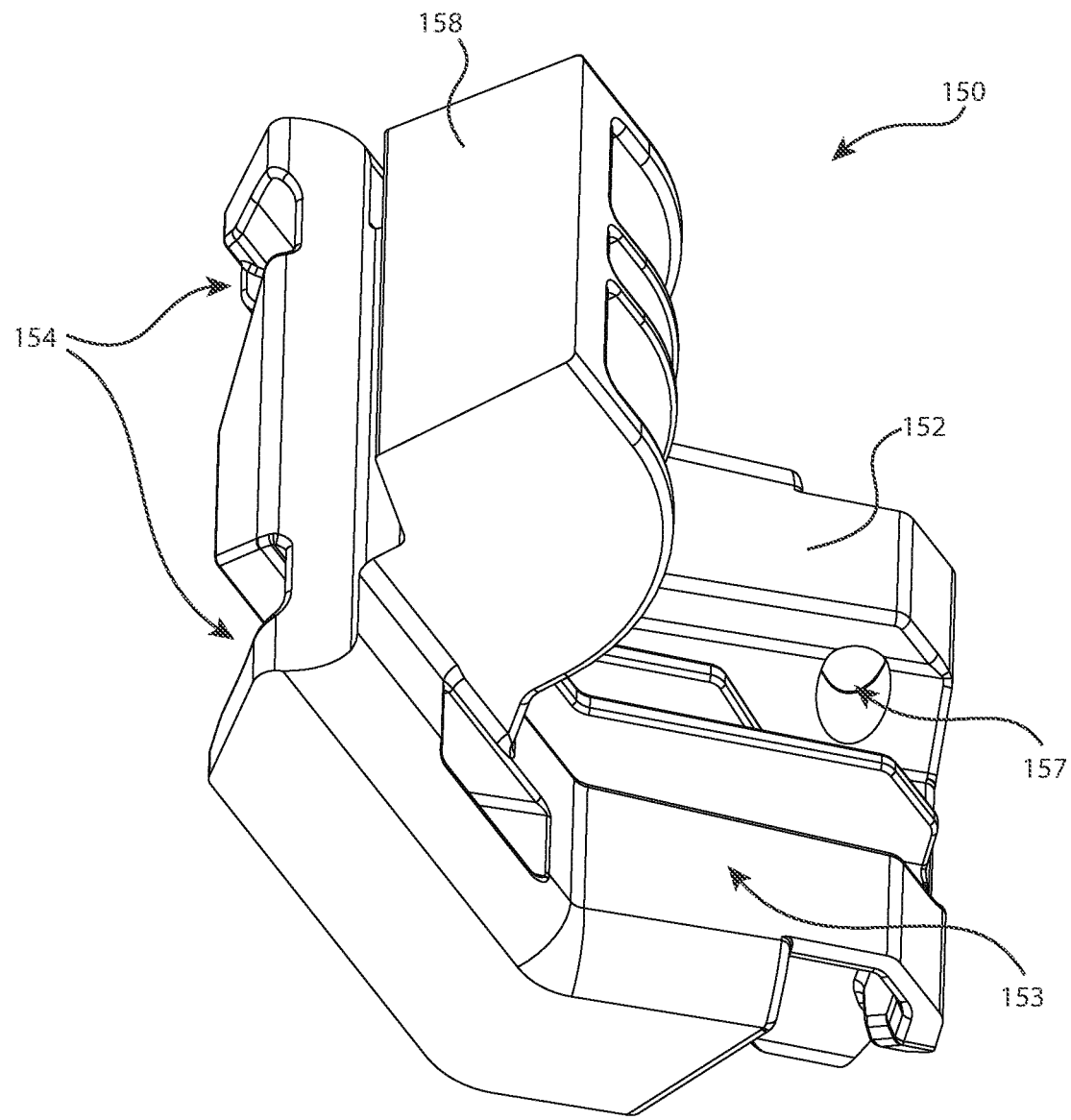
FIG. 13C is a top, front, left side perspective view of the vehicle member of FIG. 13A.
Figure 13D:
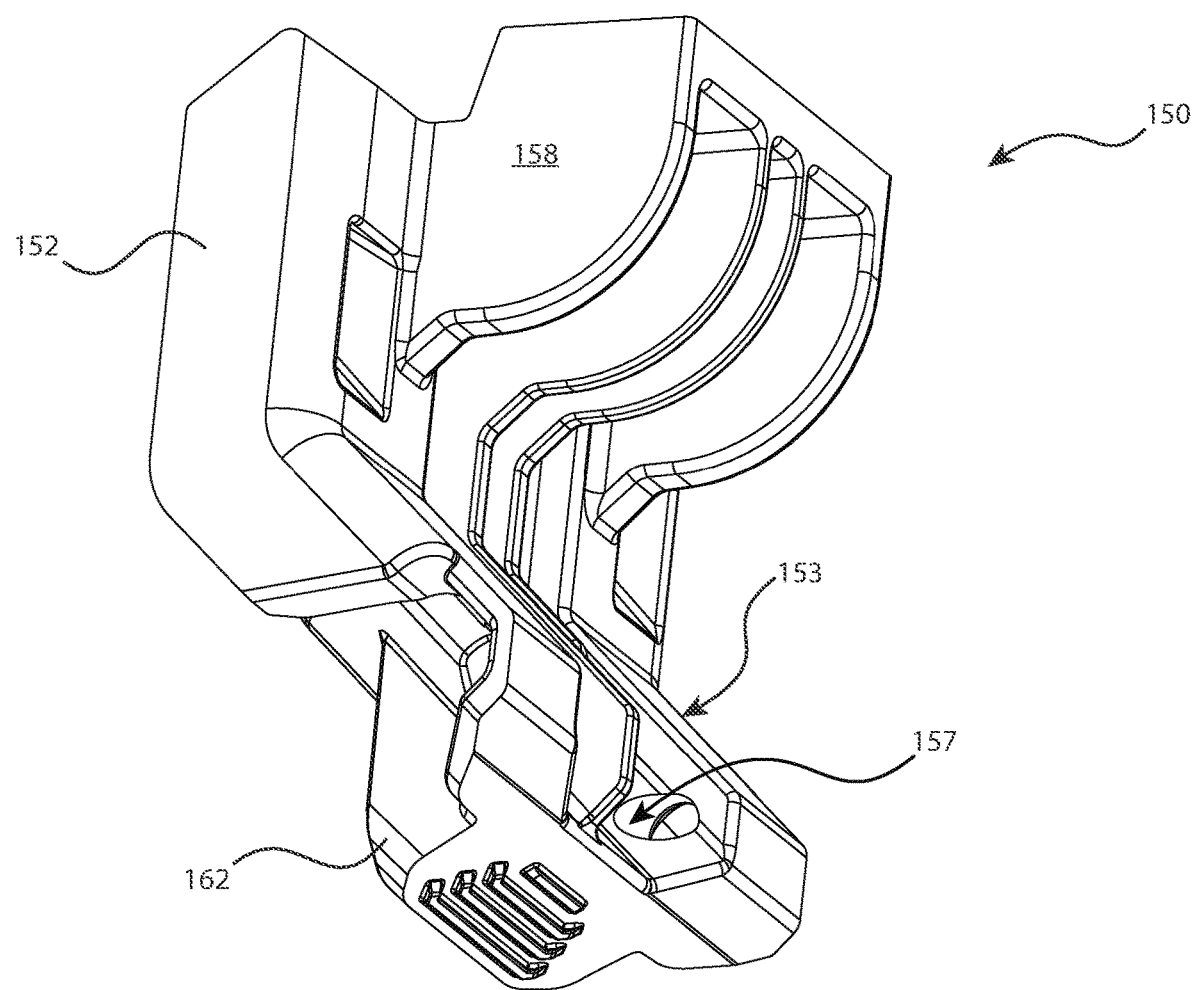
FIG. 13D is a top, front, right side perspective view of the vehicle member of FIG. 13A.

The connecting member 140 and the vehicle member 150 pivot about the axis 149 with respect to one another when the connecting member 140 is not retained in the grooves 154 by the protrusions 156. As is illustrated in FIG. 12B, the pivot axis 149 passes through the center of the ends 145, and thus passes through the center of the apertures 157.

A curved projection 158 extends generally forward and leftward from the vehicle member body 152, with a distal end of the projection 158 extending generally toward the windshield member 130. The projection 158 extends through the aperture 85 when the windshield 102 is connected to the legs 84 by the clip assembly 120.

Figure 15:
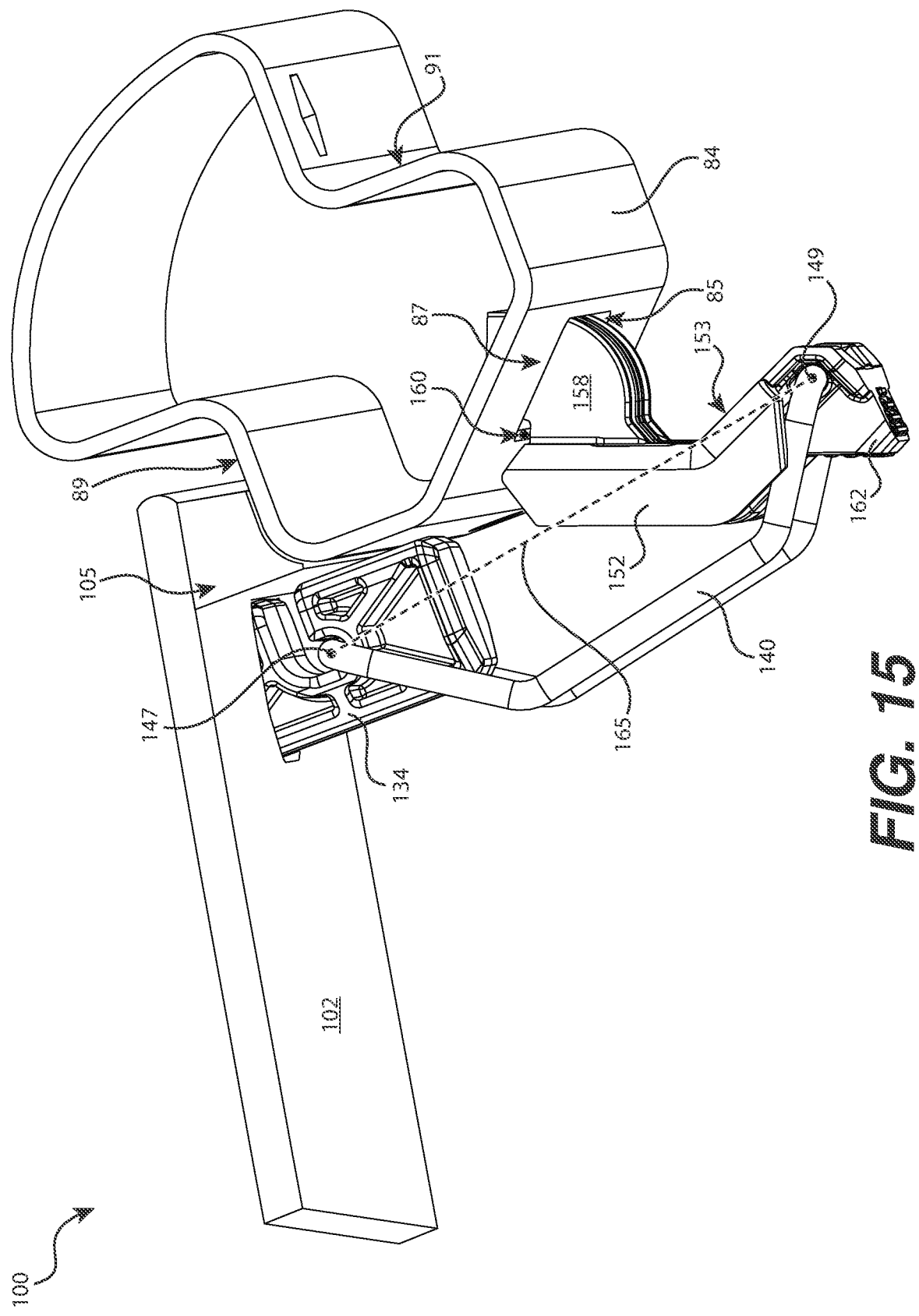
FIG. 15 is the top, rear perspective view of FIG. 14, with the clip assembly being partially engaged with the roll cage.

The projection 158 defines a pivot axis 160 about which the vehicle member 150 pivots with respect to leg 84 when the clip assembly 120 transitions between the latched position and the unlatched position. As can be seen in FIG. 15, the pivot axis 160 is generally defined by a surface of the projection 158 where the projection 158 contacts an edge of the aperture 85. It should be noted that the axes 147, 149 are each parallel to the pivot axis 160, such that when the members 130, 140, 150 are moved with respect to one another, the pivoting occurs generally normal to a same plane.

The projection 158 has a rectangular cross-section (see FIG. 13C) which is sized to fit through the aperture 85 and forms a curve extending from the vehicle member body 152. The curve formed by the projection 158 is partially centered about the pivot axis 160. As such, the rectangular projection 158 fits through the rectangular aperture 85 and as the vehicle member 150 is pivoted about the pivot axis 160 (described further below), the curved shape of the projection 158 allows it to rotate into and out of the hollow interior of the leg 84.

The vehicle member 150 also includes a gripping portion 162 to facilitate handling of the vehicle member 150. The gripping portion 162 is generally wedged shaped with textured sides, although it is contemplated that it could be differently shaped. As will be described in more detail below, the gripping portion 162 is used to pivot the vehicle member 150 between the latched and unlatched positions.

As mentioned above, the windshield member 130, the connecting member 140, and the vehicle member 150 form an overcenter latch, moveable between the unlatched position and the latched position. As an overcenter latch, the assembly 120 cannot transition between the unlatched and latched positions without passing a "center" point which has additional resistance compared to moving the clip assembly 120 when disconnected from the vehicle 10. Tension forces created between the resilient sealing member 105, the connecting member 140, and the contact between the vehicle member 150 and the aperture 85 are such that the clip assembly 120 cannot pass this center point without overcoming this tension by the user imparting additional force (compared to the unattached case).

To better understand the overcenter function of the clip assembly 120, a line 165 of the clip assembly 120 can be defined, which extends from the axis 147 to the axis 149 and is normal to the pivot axis 160. It should be noted that the line 165 is meant only to be explicative and is not necessarily meant to represent any specific physical characteristics of the clip assembly 120.

The center point described above, for the present implementation, is generally where the line 165 crosses with the pivot axis 160. For the right side clip assemblies 120, when the clip assembly 120 is in the unlatched position, the line 165 is disposed on a left side of the pivot axis 160, as is shown in FIG. 15. When the clip assembly 120 is in the latched position, the line 165 is disposed on a right side of the pivot axis 160 and extends partially through the leg 84, as is shown in FIG. 16. For left side clip assemblies 120, the left/right orientations above are reversed.

To pass over the center point, the user needs to exert enough force when pivoting the projection 158 into or out of the aperture 85 that the sealing member 105 compresses slightly. This slight compression gives the connecting member 140 enough slack so that the end of the vehicle member 150 (and the line 165) can pass the pivot axis 160. It is contemplated that in some implementations, the connecting member 140 and/or the vehicle member 150 could alternatively or additionally deform under the force applied to overcome the tension preventing the clip assembly 120 from crossing the center point.

Figure 14:
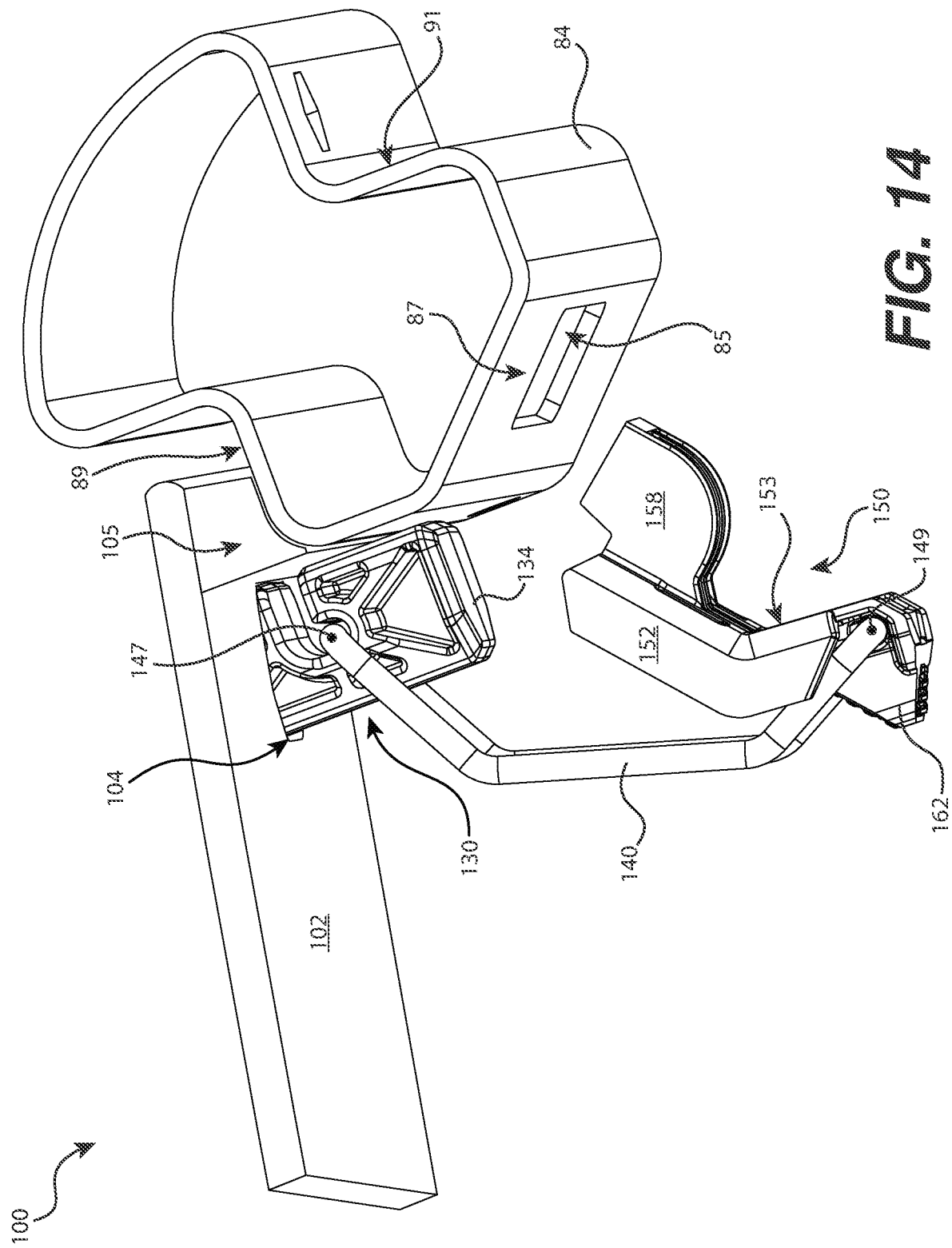
FIG. 14 is a top, rear perspective view of the portion of the windshield assembly and the portion of the roll cage of FIG. 4, with the clip assembly in a fully unlatched position.

Turning now to FIGS. 14 to 16, use of the clip assembly 120 will now be described in more detail with reference to a method of installing and removing the windshield assembly 100.

Prior to installing the windshield 102 on the vehicle 10, the windshield member 130, having been previously disconnected from the connecting member 140, is inserted into the windshield aperture 104 such that the windshield member head 132 is on a forward, exterior side of the windshield 102, as defined by its position once installed on the vehicle 10. The connecting member 140 is then connected to the windshield member 130 by inserting the forward portion 142 into the slot 136 and pushing the connecting member 130 past the protrusions 138. The vehicle member 150 is then connected to the connecting member 140 if the members 140, 150 were not previously connected together.

For each of the four windshield members 130, each connecting member 140 is connected to the windshield member 130 once it has been passed through the windshield aperture 104, which aids in preventing the windshield member 130 from being displaced from the windshield aperture 104 during handling of the windshield 102. It is contemplated, however, that the connecting members 140 and the vehicle members 150 could be connected to each of the windshield members 130 after all the windshield members 130 have been inserted. All four connecting members 140 are connected before installing the windshield 102 on the legs 84, as it is more difficult to connect the connecting member 140 to the windshield member 130 once the windshield 102 is disposed on the vehicle 10 due to the position of the windshield member body 134 in relation to the leg 84, as can be seen in the Figures. It is contemplated, however, that the connecting members 140 could be connected to the windshield members 130 after the windshield 102 is installed on the vehicle 10.

With the four clip assemblies 120 in place in the windshield apertures 104, the windshield 102 is then placed on the vehicle 10. Specifically, the windshield 102 is placed on the legs 84 such that the sealing member 105 contacts the windshield sealing surface 89, with the windshield member head 132 on an exterior of the windshield 102 and remaining portions of the clip assemblies 120 being disposed inside the cockpit area 22. As is illustrated in FIG. 14, at this point each clip assembly 120 is in a fully unlatched position.

Next, the clip assemblies 120 are connected to the legs 84 by moving the members 130, 140, 150 from the unlatched position to the latched positions. The order in which the four clip assemblies 120 are placed in the latched position is not important.

Generally, the manner of connecting the upper right clip assembly 120 into the upper right windshield aperture 104 of the windshield 102 will be described. The lower right clip assembly 120 is inserted in the lower right windshield aperture 104 in the same manner and as such the manner of inserting this clip assembly 120 will not be described in detail herein. The lower and upper left clip assemblies 120 are inserted in the lower and upper left windshield apertures 104 in the same manner as the upper right clip assembly 120 but with the left/right orientations reversed as would be understood and as such the manner of inserting these clip assemblies 120 will also not be described in detail herein.

First, the projection 158 of the vehicle member 150 is partially inserted into the aperture 85 of the leg 84, as is illustrated in FIG. 15. A user installing the windshield assembly 100 grasps the gripping portion 162 and pivots the vehicle member 150 counter-clockwise about the pivot axis 160 toward the clip surface 87. As mentioned above, tension forces do not allow the vehicle member 150 to turn such that the line 165 passes the pivot axis 160 unless an outside force acts on the vehicle member 150 to overcome the resistance of the tension about the center point. To apply this force, the user pushes the gripping portion 162 toward the clip surface 87, which applies a torque to the vehicle member 150 about the pivot axis 160. The torque in turn pulls the connecting member 140 away from the windshield 102, which in turn pulls on the windshield member 130, causing the sealing member 105 to compress slightly. This in turn gives the connecting member 140 enough slack for the end of the vehicle member 150 (and the line 165) to pass the center point.

After passing the center point (but before reaching the fully latched position of FIG. 16), the connecting member 140 pushes past the protrusions 156 of the vehicle member 150, at which point the protrusions 156 provide additional aid in keep the clip assembly 120 in the latched position. Further, decompression of the sealing member 105, once the clip assembly 120 passes the center point, further pushes the vehicle member 150 toward the leg 84, which also aids in keeping the clip assembly 120 in the latched position.

Once all the clip assemblies 120 are installed and in the latched position as described above and as illustrated in FIG. 16, the windshield assembly 100 is securely connected to the roll cage 72.

For the same reason as described above regarding the manner of installing the windshield assembly 100, only the manner of removing the upper right clip assembly 120 will be described in detail herein.

To remove the windshield 102, each clip assembly 120 is moved from the latched position to the unlatched position. The order in which the four clip assemblies 120 are placed in the unlatched position is not important. To move from the latched position to the unlatched position, the user who is inside the cockpit area 22 pulls the vehicle member 150 with one of their hands generally rearward and leftward away from the legs 84 by pulling on the gripping portion 162, such that the vehicle member 150 pivots about the pivot axis 160.

As was the case for moving from the unlatched position to the latched position above, the user will need to provide extra force to slightly compress the sealing member 105, in order to rotate the vehicle member 150 to where the line 165 has passed the pivot axis 160 and the tension on the clip assembly 120 will then force the clip assembly 120 toward an unlatched position, instead of the latched position. At this point, the clip assembly 120 has been returned to the unlatched position illustrated in FIG. 15. The projection 158 of each vehicle member 150 can now be removed from its corresponding aperture 85 (the order is again not important).

The windshield assembly 100, including the windshield 102 and the four clip assemblies 120 installed thereon, can now be removed from the vehicle 10. The windshield 102 is pivoted forward, and then lifted upward and forward from the legs 84 of the roll cage 72 to remove the windshield assembly 100 from the vehicle 10. The clip assemblies 120 can be left installed on the windshield 102, or the connecting members 140 can be removed from the windshield members 130 in order to remove each clip assembly 120. In some such cases, the clip assemblies 120 may be removed in order to protect and store the clip assemblies 120 and the windshield 102 separately.

The clip assembly 120, the windshield assembly 100, and the vehicle 10 implemented in accordance with some nonlimiting implementations of the present technology can be represented as presented in the following numbered clauses.

CLAUSE 1. A clip assembly (120) for selectively connecting a windshield (102) to at least one frame member (84) of a vehicle (10), the at least one frame member (84) defining at least one frame aperture (85), the windshield (102) defining at least one windshield aperture (104), the clip assembly (120) comprising a windshield member (130) including: a windshield member head (132) larger than a corresponding portion of the at least one windshield aperture (104), and a windshield member body (134) extending from the windshield member head (132), the windshield member body (134) being sized and shaped for passing through the at least one windshield aperture (104); a vehicle member (150) for partially inserting into the at least one frame aperture (85), the vehicle member (150) including: a vehicle member body (152), and a projection (158) extending from the vehicle member body (152), the projection (158) extending through the at least one frame aperture (85) when the windshield (102) is connected to the at least one frame member (84) by the clip assembly (120), the projection (158) defining a pivot axis (160) about which the vehicle member (150) pivots with respect to the at least one frame member (84) when transitioning between a latched position and an unlatched position; and a connecting member (140) selectively connected between the windshield member body (134) and the vehicle member body (152), the windshield member (130), the connecting member (140), and the vehicle member (150) forming an overcenter latch.

CLAUSE 2. The clip assembly (120) of clause 1, wherein: a first end of the connecting member (140) defines a first axis (147) about which the connecting member (140) pivots with respect to the windshield member (130), the first axis (147) being parallel to the pivot axis (160); a second end of the connecting member (140) defines a second axis (149) about which the connecting member (140) pivots with respect to the vehicle member (150), the second axis (149) being parallel to the pivot axis (160); in the latched position, a line (165) extending from the first axis (147) to the second axis (149) is disposed on a first side of the pivot axis (160), the line (165) being normal to the pivot axis (160); and in the unlatched position, the line (165) is disposed on a second side of the pivot axis (160) opposite the first side.

CLAUSE 3. The clip assembly (120) of clause 1 or 2, wherein the projection (158) of the vehicle member (150) is curved such that a distal end of the projection (158) extends generally toward the windshield member (130).

CLAUSE 4. The clip assembly (120) of any one of clauses 1 to 3, wherein the projection (158) at least partially forms a curve centered about the pivot axis (160).

CLAUSE 5. The clip assembly (120) of any one of clauses 1 to 4, wherein: the windshield member body (134) defines a slot (136) for receiving an upper portion of the connecting member (140); and the vehicle member body (152) defines at least one groove (154) for receiving a lower portion of the connecting member (140).

CLAUSE 6. The clip assembly (120) of clause 5, wherein the at least one groove (154) is a first groove (154); the vehicle member (150) further defines a second groove (154); the vehicle member (150) further comprises a first protrusion (156) and a second protrusion (156); and the first protrusion (156) extends partially over the first groove (154) and the second protrusion (156) extends partially over the second groove (154), the protrusions (156) being adapted for aiding in maintaining the connecting member (140) in the grooves (154) when the clip assembly (120) is in the latched position.

CLAUSE 7. The clip assembly (120) of clause 5, wherein the windshield member body (134) includes at least one protrusion (138) extending into the slot (136) to aid in keeping the connecting member (140) in the slot (136).

CLAUSE 8. The clip assembly (120) of any one of clauses 1 to 7, wherein the connecting member (140) is a rigid wire (140).

CLAUSE 9. The clip assembly (120) of clause 8, wherein the rigid wire (140) is bent near a central region (146) of the rigid wire (140) such that one portion (142) of the rigid wire (140) is generally aligned with the windshield member body (134), and an other portion (144) of the rigid wire (140) is generally aligned with the vehicle member body (152).

CLAUSE 10. The clip assembly (120) of any one of clauses 1 to 9, wherein the vehicle member body (152) has a vehicle abutting surface (153); the vehicle abutting surface (153) being sized and shaped to contacts a clip surface (87) of the at least one frame member (84) when the windshield (102) is connected to the at least one frame member (84) by the clip assembly (120) and the clip assembly (120) is in the latched position; and the vehicle abutting surface (153) is spaced from the clip surface (87) when the clip assembly (120) is in the unlatched position.

CLAUSE 11. The clip assembly (120) of clause 10, wherein the vehicle abutting surface (153) is at least partially concave.

CLAUSE 12. A windshield assembly (100) for selectively connecting to at least one frame member (84) of a vehicle (10), the at least one frame member (84) defining at least one frame aperture (85), the windshield assembly (100) comprising a windshield (102) defining at least one windshield aperture (104); and at least one clip assembly (120) including a windshield member (130) including a windshield member head (132) larger than a corresponding portion of the at least one windshield aperture (104), and a windshield member body (134) extending from the windshield member head (132), the windshield member body (134) being sized and shaped for passing through the at least one windshield aperture (104); a vehicle member (150) for partially inserting into the at least one frame aperture (85) including a vehicle member body (152), and a projection (158) extending from the vehicle member body (152), the projection (158) extending through the at least one frame aperture (85) when the windshield (102) is connected to the at least one frame member (84) by the clip assembly (120), the projection (158) defining a pivot axis (160) about which the vehicle member (150) pivots with respect to the at least one frame member (84) when transitioning between a latched position and an unlatched position; and a connecting member (140) selectively connected between the windshield member body (134) and the vehicle member body (152), the windshield member (130), the connecting member (140), and the vehicle member (150) forming an overcenter latch.

CLAUSE 13. The windshield assembly (100) of clause 12, wherein a first end of the connecting member (140) defines a first axis (147) about which the connecting member (140) pivots with respect to the windshield member (130), the first axis (147) being parallel to the pivot axis (160); a second end of the connecting member (140) defines a second axis (149) about which the connecting member (140) pivots with respect to the vehicle member (150), the second axis (149) being parallel to the pivot axis (160); in the latched position, a line (165) extending from the first axis (147) to the second axis (149) is disposed on a first side of the pivot axis (160), in the latched position, the line (165) extending at least partially through the at least one frame member (84); and in the unlatched position, the line (165) is disposed on a second side of the pivot axis (160) opposite the first side, the line (165) being normal to the pivot axis (160).

CLAUSE 14. The windshield assembly (100) of clause 12 or 13, wherein the at least one windshield aperture (104) is a first windshield aperture (104); the at least one frame member (84) is first frame member (84); the at least one frame aperture (85) is a first frame aperture (85); the at least one clip assembly (120) is a first clip assembly (120); the first clip assembly (120) fastens the windshield (102) to the vehicle (10) using the first windshield aperture (104) and the first frame aperture (85) of the first frame member (84); the vehicle (10) further includes a second frame member (84) defining a second frame aperture (85), the second frame member (84) being disposed on an opposite lateral side of the vehicle (10) from the first frame member (84); the windshield (102) further defines a second windshield aperture (104) on a lateral side of the windshield (102) opposite the first windshield aperture (104); the windshield (102) assembly further comprises a second clip assembly (120); and the second clip assembly (120) further fastens the windshield (102) to the vehicle (10) using the second windshield aperture (104) and the second frame aperture (85) of the second frame member (84).

CLAUSE 15. The windshield assembly (100) of clause 12 or 13, wherein the at least one windshield aperture (104) is a plurality of windshield apertures (104); the at least one frame aperture (85) is a plurality of frame apertures (85); the at least one clip assembly (120) is a plurality of clip assemblies (120); each clip assembly (120) fastens the windshield (102) to the vehicle (10) using one of the plurality of windshield apertures (104) and a corresponding one of the plurality of frame apertures (85).

CLAUSE 16. The windshield assembly (100) of any one of clauses 12 to 15, further comprising a resilient sealing member (105) disposed near at least a portion of an edge of the windshield (102).

CLAUSE 17. A vehicle (10) comprising a frame (12); at least two ground engaging members (14, 18) operatively connected to the frame (12); a motor (20) connected to the frame (12) and operatively connected to at least one of the at least two ground engaging members (14, 18); at least one seat (24, 26) connected to the frame (12); and the windshield assembly (100) according to clause 12 selectively connected to the frame (12), the frame (12) including the at least one frame member (84) defining the at least one frame aperture (85).

CLAUSE 18. The vehicle (10) of clause 17, wherein the at least one frame member (84) includes at least a windshield sealing surface (89), a door sealing surface (91), and a clip surface (87) disposed laterally between the windshield sealing surface (89) and the door sealing surface (91); the at least one frame aperture (85) is defined in the clip surface (87); and when the windshield (102) is connected to the vehicle (10) and the windshield (102) abuts the windshield sealing surface (89), the at least one clip assembly (120) does not extend past an edge of the door sealing surface (91) such that the at least one clip assembly (120) does not impede a door moveably connected to the vehicle (10) from smoothly contacting the door sealing surface (91).

CLAUSE 19. The vehicle (10) of clause 18, wherein the vehicle member body (152) has a vehicle abutting surface (153); the vehicle abutting surface (153) contacts the clip surface (87) when the windshield (102) is connected to the at least one frame member (84) by the clip assembly (120) and the clip assembly (120) is in the latched position; and the vehicle abutting surface (153) is spaced from the clip surface (87) when the clip assembly (120) is in the unlatched position.

CLAUSE 20. The vehicle (10) of clause 19, wherein the vehicle member (150) is shaped such that the vehicle abutting surface (153) lies flush with the clip surface (87) when the clip assembly (120) is in the latched position.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A clip assembly for selectively connecting a windshield to at least one frame member of a vehicle, the at least one frame member defining at least one frame aperture, the windshield defining at least one windshield aperture, the clip assembly comprising:
    a windshield member including:
        a windshield member head larger than a corresponding portion of the at least one windshield aperture, and
        a windshield member body extending from the windshield member head, the windshield member body being sized and shaped for passing through the at least one windshield aperture;
    a vehicle member for partially inserting into the at least one frame aperture, the vehicle member including:
        a vehicle member body, and
        a projection extending from the vehicle member body, the projection extending through the at least one frame aperture when the windshield is connected to the at least one frame member by the clip assembly, the projection defining a pivot axis about which the vehicle member pivots with respect to the at least one frame member when transitioning between a latched position and an unlatched position; and
    a connecting member selectively connected between the windshield member body and the vehicle member body,
    the windshield member, the connecting member, and the vehicle member forming an overcenter latch.

2. The clip assembly of claim 1, wherein:
    a first end of the connecting member defines a first axis about which the connecting member pivots with respect to the windshield member, the first axis being parallel to the pivot axis;
    a second end of the connecting member defines a second axis about which the connecting member pivots with respect to the vehicle member, the second axis being parallel to the pivot axis;
    in the latched position, a line extending from the first axis to the second axis is disposed on a first side of the pivot axis, the line being normal to the pivot axis; and
    in the unlatched position, the line is disposed on a second side of the pivot axis opposite the first side.

3. The clip assembly of claim 1, wherein the projection of the vehicle member is curved such that a distal end of the projection extends generally toward the windshield member.

4. The clip assembly of claim 1, wherein the projection at least partially forms a curve centered about the pivot axis.

5. The clip assembly of claim 1, wherein:
    the windshield member body defines a slot for receiving an upper portion of the connecting member; and
    the vehicle member body defines at least one groove for receiving a lower portion of the connecting member.

6. The clip assembly of claim 5, wherein:
the at least one groove is a first groove;
the vehicle member further defines a second groove;
the vehicle member further comprises a first protrusion and a second protrusion; and
the first protrusion extends partially over the first groove and the second protrusion extends partially over the second groove,
the protrusions being adapted for aiding in maintaining the connecting member in the grooves when the clip assembly is in the latched position.

7. The clip assembly of claim 5, wherein the windshield member body includes at least one protrusion extending into the slot to aid in keeping the connecting member in the slot.

8. The clip assembly of claim 1, wherein the connecting member is a rigid wire.

9. The clip assembly of claim 8, wherein the rigid wire is bent near a central region of the rigid wire such that:
one portion of the rigid wire is generally aligned with the windshield member body, and
an other portion of the rigid wire is generally aligned with the vehicle member body.

10. The clip assembly of claim 1, wherein:
the vehicle member body has a vehicle abutting surface;
the vehicle abutting surface being sized and shaped to contact a clip surface of the at least one frame member when the windshield is connected to the at least one frame member by the clip assembly and the clip assembly is in the latched position; and
the vehicle abutting surface is spaced from the clip surface when the clip assembly is in the unlatched position.

11. The clip assembly of claim 10, wherein the vehicle abutting surface is at least partially concave.

12. A windshield assembly for selectively connecting to at least one frame member of a vehicle, the at least one frame member defining at least one frame aperture, the windshield assembly comprising:
a windshield defining at least one windshield aperture; and
at least one clip assembly including:
a windshield member including:
a windshield member head larger than a corresponding portion of the at least one windshield aperture, and
a windshield member body extending from the windshield member head, the windshield member body being sized and shaped for passing through the at least one windshield aperture;
a vehicle member for partially inserting into the at least one frame aperture including:
a vehicle member body, and
a projection extending from the vehicle member body, the projection extending through the at least one frame aperture when the windshield is connected to the at least one frame member by the clip assembly, the projection defining a pivot axis about which the vehicle member pivots with respect to the at least one frame member when transitioning between a latched position and an unlatched position; and
a connecting member selectively connected between the windshield member body and the vehicle member body,
the windshield member, the connecting member, and the vehicle member forming an overcenter latch.

13. The windshield assembly of claim 12, wherein:
a first end of the connecting member defines a first axis about which the connecting member pivots with respect to the windshield member, the first axis being parallel to the pivot axis;
a second end of the connecting member defines a second axis about which the connecting member pivots with respect to the vehicle member, the second axis being parallel to the pivot axis;
in the latched position, a line extending from the first axis to the second axis is disposed on a first side of the pivot axis,
in the latched position, the line extending at least partially through the at least one frame member; and
in the unlatched position, the line is disposed on a second side of the pivot axis opposite the first side,
the line being normal to the pivot axis.

14. The windshield assembly of claim 12, wherein:
the at least one windshield aperture is a first windshield aperture;
the at least one frame member is first frame member;
the at least one frame aperture is a first frame aperture;
the at least one clip assembly is a first clip assembly;
the first clip assembly fastens the windshield to the vehicle using the first windshield aperture and the first frame aperture of the first frame member;
the vehicle further includes a second frame member defining a second frame aperture, the second frame member being disposed on an opposite lateral side of the vehicle from the first frame member;
the windshield further defines a second windshield aperture on a lateral side of the windshield opposite the first windshield aperture;
the windshield assembly further comprises a second clip assembly; and
the second clip assembly further fastens the windshield to the vehicle using the second windshield aperture and the second frame aperture of the second frame member.

15. The windshield assembly of claim 12, wherein:
the at least one windshield aperture is a plurality of windshield apertures;
the at least one frame aperture is a plurality of frame apertures;
the at least one clip assembly is a plurality of clip assemblies;
each clip assembly fastens the windshield to the vehicle using one of the plurality of windshield apertures and a corresponding one of the plurality of frame apertures.

16. The windshield assembly of claim 12, further comprising a resilient sealing member disposed near at least a portion of an edge of the windshield.

17. A vehicle comprising:
a frame;
at least two ground engaging members operatively connected to the frame;
a motor connected to the frame and operatively connected to at least one of the at least two ground engaging members;
at least one seat connected to the frame; and
the windshield assembly according to claim 12 selectively connected to the frame,
the frame including the at least one frame member defining the at least one frame aperture.

18. The vehicle of claim 17, wherein:
the at least one frame member includes at least:
- a windshield sealing surface,
- a door sealing surface, and
- a clip surface extending between the windshield sealing surface and the door sealing surface;

the at least one frame aperture is defined in the clip surface; and when the windshield is connected to the vehicle and the windshield abuts the windshield sealing surface, the at least one clip assembly does not extend past an edge of the door sealing surface such that the at least one clip assembly does not impede a door moveably connected to the vehicle from smoothly contacting the door sealing surface.

19. The vehicle of claim 18, wherein:
the vehicle member body has a vehicle abutting surface;
the vehicle abutting surface contacts the clip surface when the windshield is connected to the at least one frame member by the clip assembly and the clip assembly is in the latched position; and
the vehicle abutting surface is spaced from the clip surface when the clip assembly is in the unlatched position.

20. The vehicle of claim 19, wherein the vehicle member is shaped such that the vehicle abutting surface lies flush with the clip surface when the clip assembly is in the latched position.

* * * * *

UNITED STATES PATENT AND TRADEMARK OFFICE
CERTIFICATE OF CORRECTION

PATENT NO. : 10,960,736 B2
APPLICATION NO. : 16/647827
DATED : March 30, 2021
INVENTOR(S) : Felix Savoie et al.

Page 1 of 1

It is certified that error appears in the above-identified patent and that said Letters Patent is hereby corrected as shown below:

In the Specification

Column 3, Line 61, "one frame member is first frame member" should read --one frame member is a first frame member--

Column 17, Lines 5-6, "one frame member (84) is first frame member (84)" should read --one frame member (84) is a first frame member (84)--

In the Claims

Claim 14, Column 20, Line 22, "one frame member is first frame member" should read --one frame member is a first frame member--

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*